(12) United States Patent
Ghassabian

(10) Patent No.: US 6,850,773 B1
(45) Date of Patent: Feb. 1, 2005

(54) ANTENNA SYSTEM FOR A WRIST COMMUNICATION DEVICE

(76) Inventor: Firooz Ghassabian, 13 Kashani Street, 69499 Tel Aviv (IL)

( * ) Notice: Subject to any disclaimer, the term of this patent is extended or adjusted under 35 U.S.C. 154(b) by 0 days.

(21) Appl. No.: 09/580,237

(22) Filed: May 26, 2000

Related U.S. Application Data

(60) Division of application No. 09/428,228, filed on Oct. 27, 1999, which is a continuation-in-part of application No. 09/422,598, filed on Oct. 21, 1999, now abandoned.

(51) Int. Cl.[7] .............................. H04M 1/00; H04M 9/00
(52) U.S. Cl. ...................... 455/550; 455/575.1; 455/90; 379/433.1
(58) Field of Search .......................... 455/550, 90, 349, 455/344, 575.1; 379/433, 430, 433.1; 368/10; D14/137, 138, 144, 192, 230

(56) References Cited

U.S. PATENT DOCUMENTS

| | | | |
|---|---|---|---|
| 5,020,094 A | * | 5/1991 | Rash et al. ................. 455/411 |
| 5,144,325 A | * | 9/1992 | Kurcbart ..................... 343/718 |
| 5,224,076 A | | 6/1993 | Thorp ......................... 368/10 |
| 5,239,521 A | | 8/1993 | Blonder ....................... 368/10 |
| 5,241,410 A | * | 8/1993 | Streck et al. ............... 398/115 |
| 5,274,513 A | | 12/1993 | Nakano ..................... 360/72.2 |
| 5,274,613 A | * | 12/1993 | Seager ......................... 368/18 |
| 5,467,324 A | * | 11/1995 | Houlihan ..................... 368/10 |
| 5,499,398 A | * | 3/1996 | Kudoh et al. ............... 455/290 |
| 5,564,082 A | * | 10/1996 | Blonder et al. .............. 455/90 |
| 5,659,611 A | * | 8/1997 | Saksa ......................... 379/433 |
| 6,005,525 A | * | 12/1999 | Kivela ........................ 343/702 |
| 6,035,035 A | * | 3/2000 | Firooz ........................ 379/433 |
| 6,078,803 A | * | 6/2000 | Fernandez Martinez .... 455/349 |
| 6,192,253 B1 | * | 2/2001 | Charlier et al. ............. 455/550 |
| 6,208,876 B1 | * | 3/2001 | Raussi et al. ............... 455/557 |
| 6,213,619 B1 | * | 4/2001 | Yu ............................. 362/103 |
| 6,272,359 B1 | * | 8/2001 | Kivela et al. ............... 455/567 |

* cited by examiner

Primary Examiner—Dwayne Bost
Assistant Examiner—Sheila Smith

(57) ABSTRACT

A wrist-mounted communication device comprising a cellular phone mechanism configured to transmit and receive communication signals. The device includes an antenna system so as to transmit and receive signals. The antenna system further comprisesat least one antenna extendable away from the horizontal plane of the communication device.

26 Claims, 20 Drawing Sheets

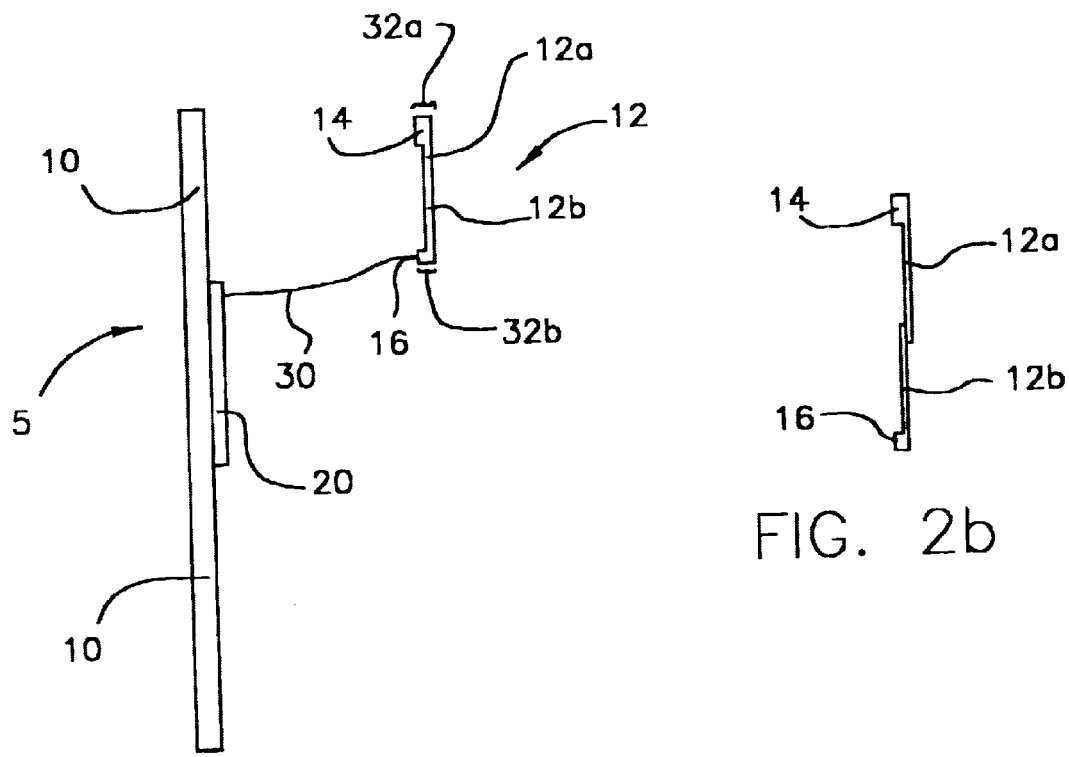
FIG. 2a
FIG. 2b
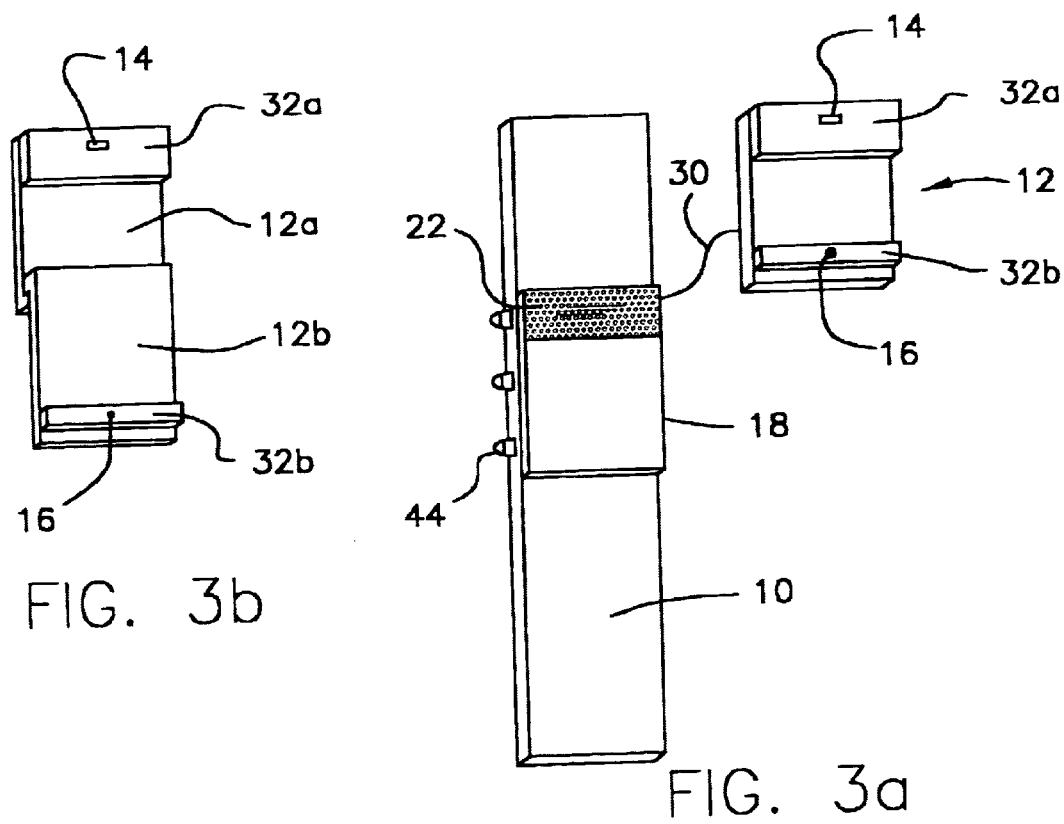
FIG. 3b
FIG. 3a

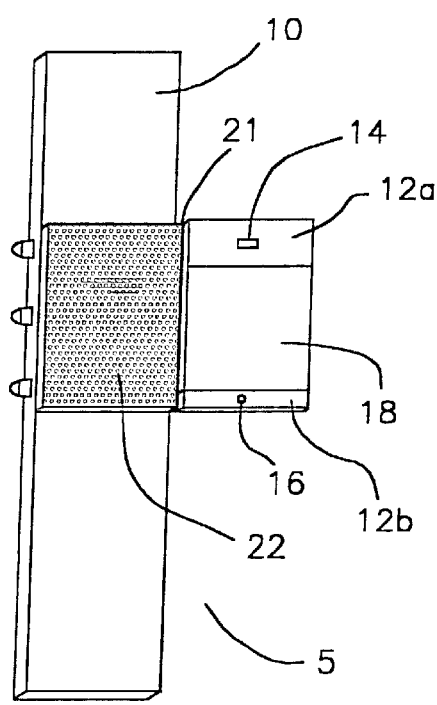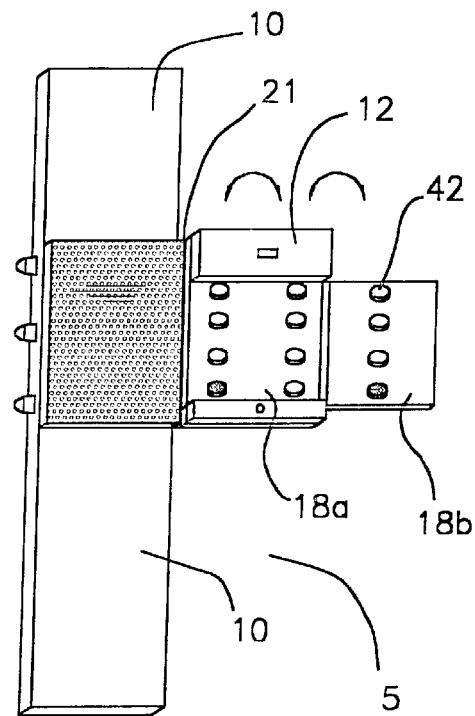
FIG. 4a
FIG. 4b
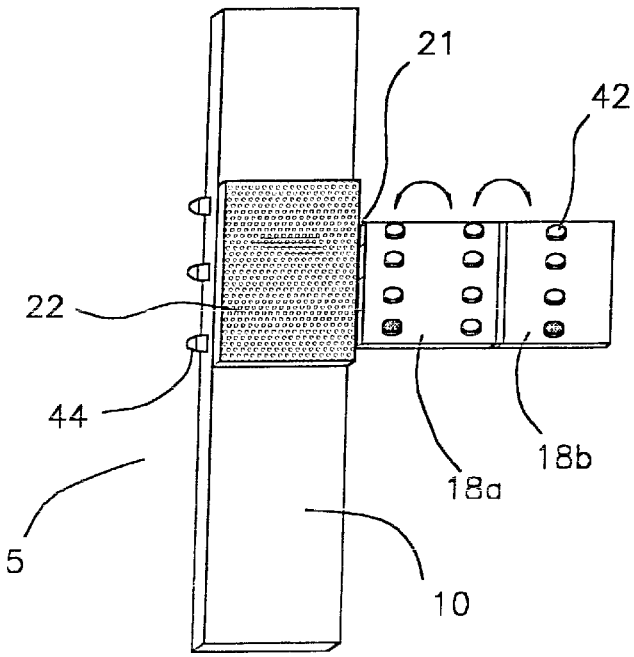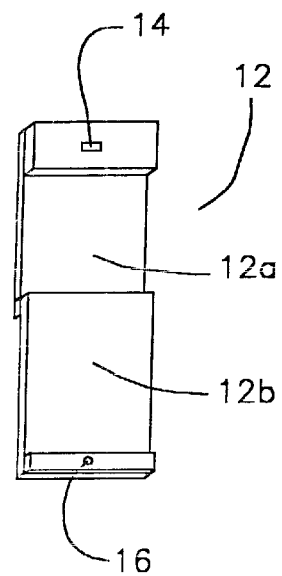
FIG. 4c
FIG. 4d

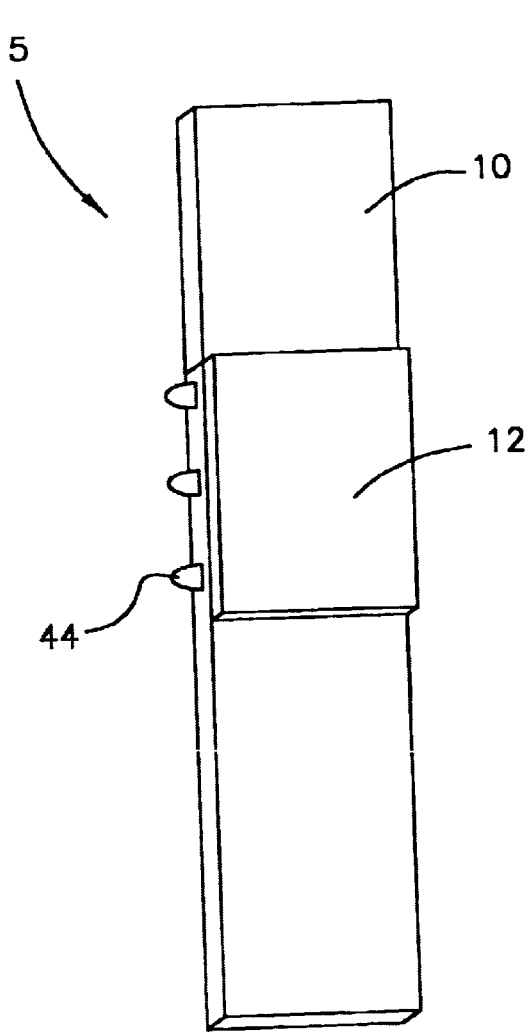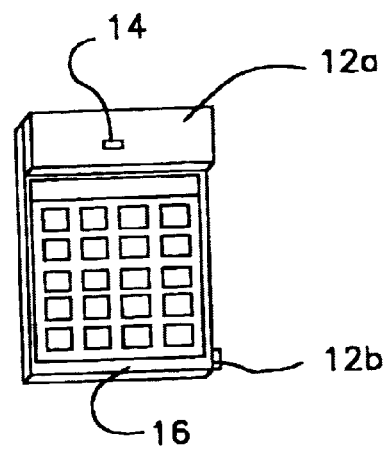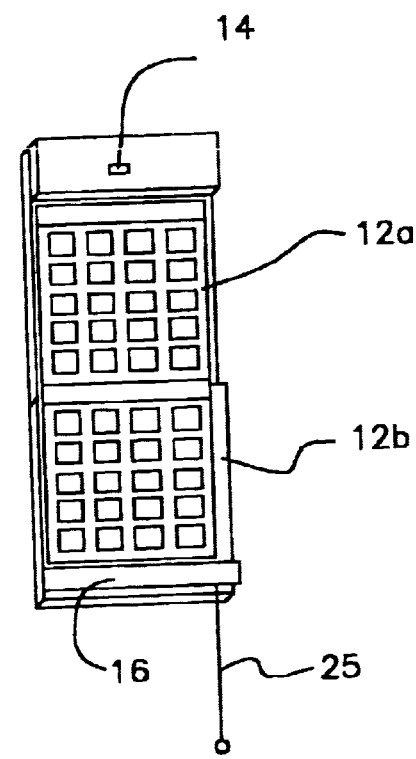
FIG. 7a
FIG. 7b
FIG. 7c

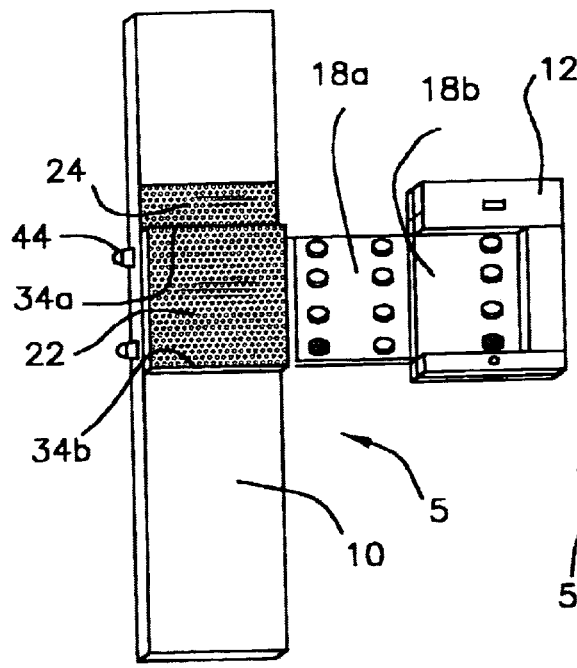
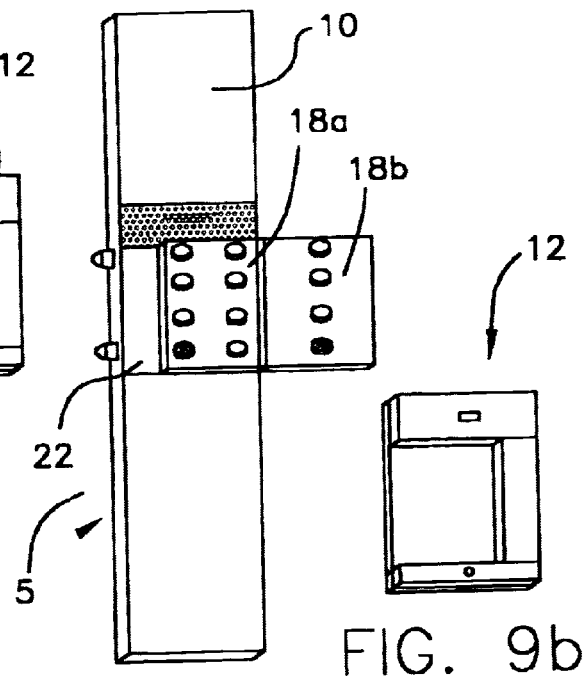
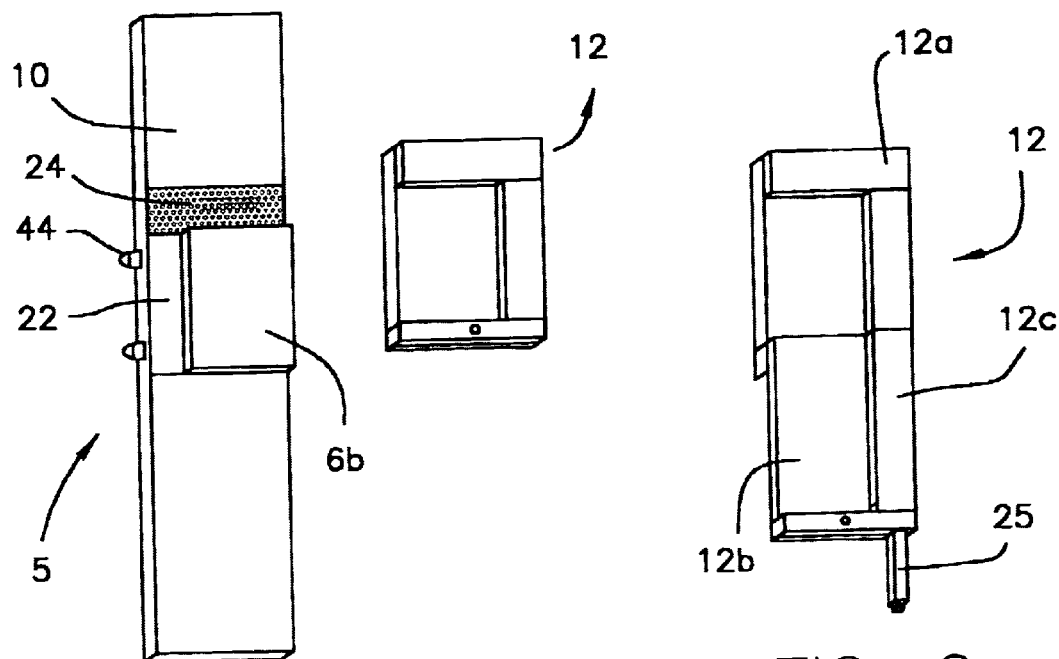

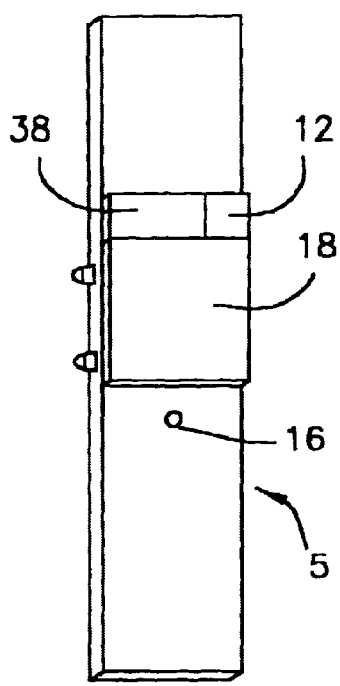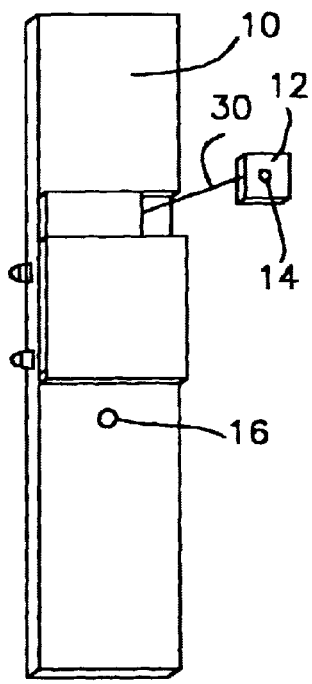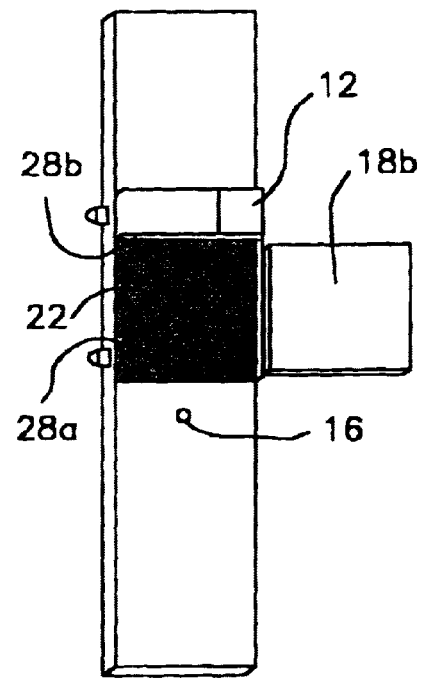
FIG. 10a          FIG. 10b          FIG. 10d
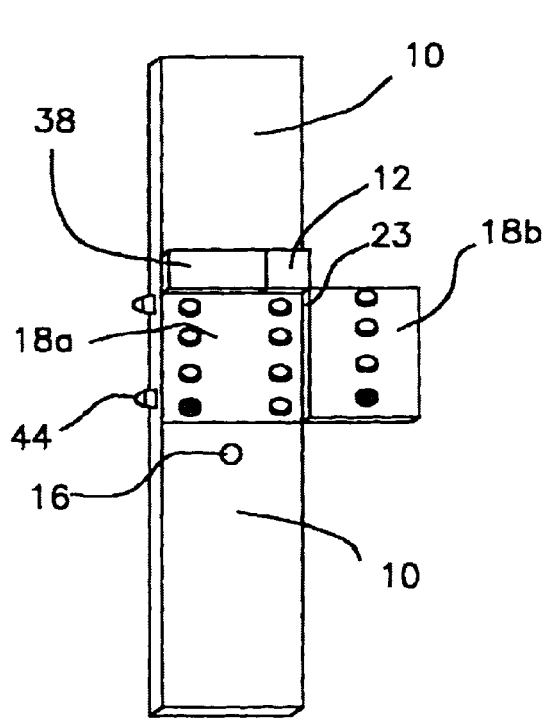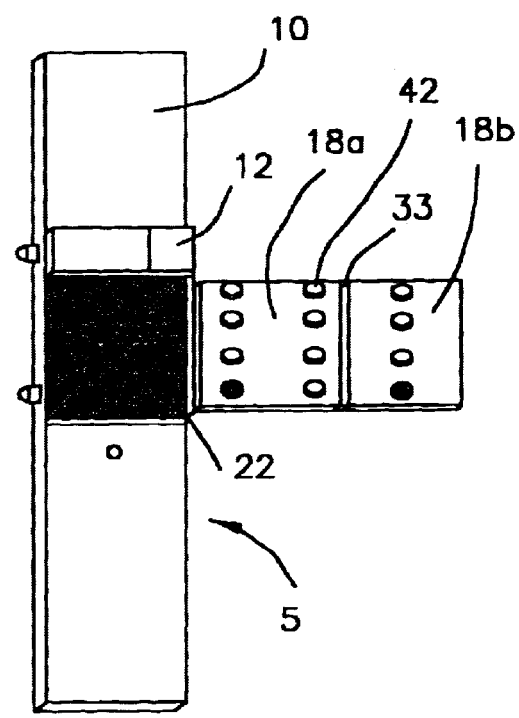
FIG. 10c          FIG. 10e

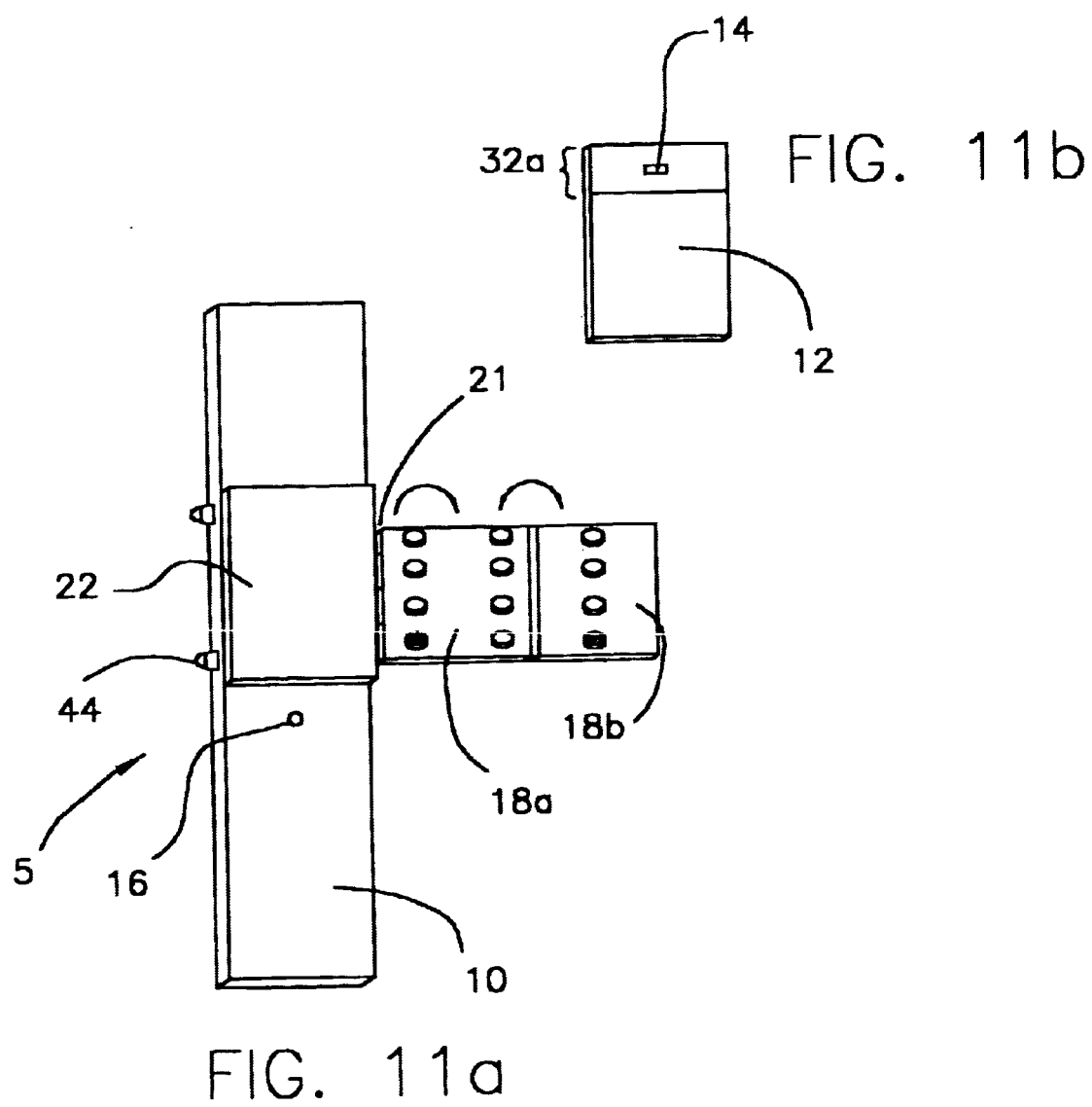

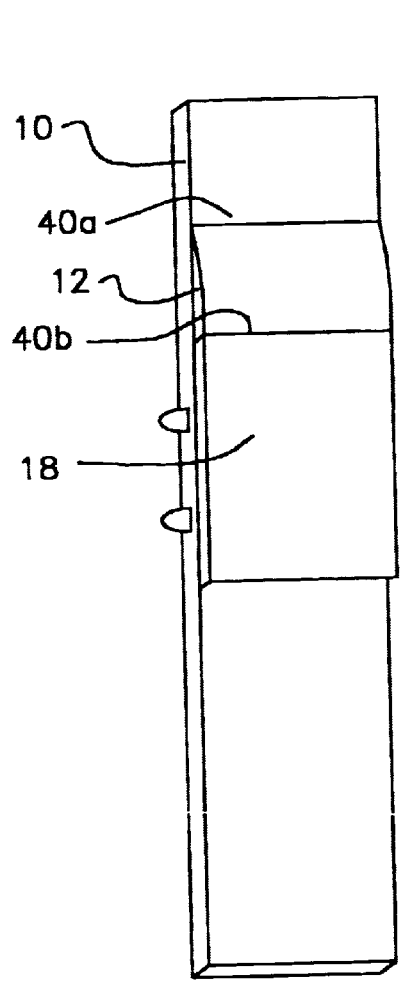
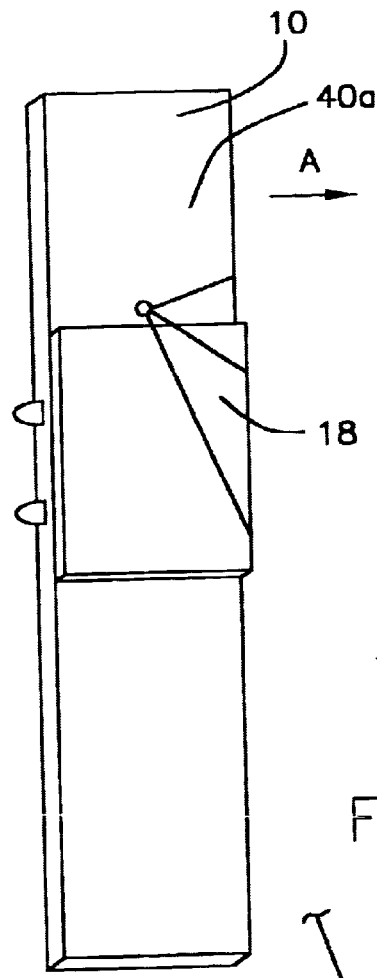
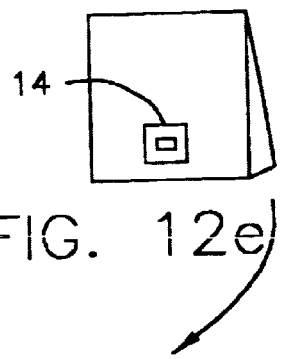
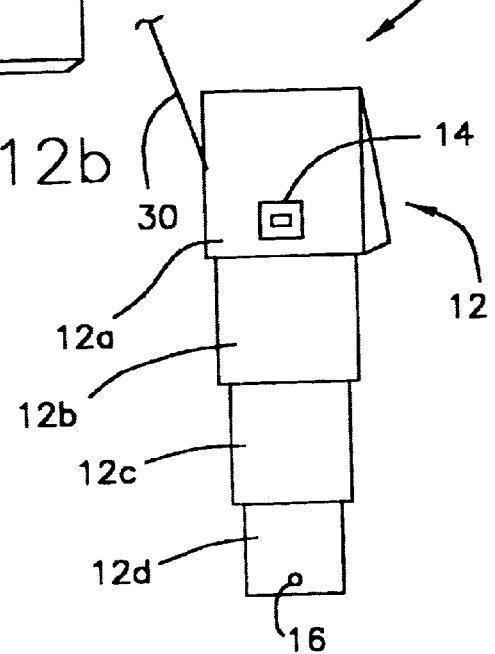
FIG. 12a  FIG. 12b  FIG. 12c  FIG. 12d  FIG. 12e

ANTENNA SYSTEM FOR A WRIST COMMUNICATION DEVICE

RELATED APPLICATIONS

This application is a divisional application of Applicant's currently pending U.S. patent application Ser. No. 09/428, 228 filed on Oct. 27, 1999, which is a continuation-in-part of Applicant's U.S. patent application Ser. No. 09/422,598 filed on Oct. 21, 1999, now abandoned, both of which are incorporated herein by reference as fully as if set forth in their entirety.

FIELD OF THE INVENTION

The present invention generally relates to portable cellular telephone devices, and more particularly to an antenna system for wrist communication systems.

BACKGROUND OF THE INVENTION

Thanks to the recent advances in wireless communication technology, cellular telephones enjoy enormous popularity. While early models were large and heavy, and therefore difficult for a user to carry comfortably, newer models have steadily decreased in size and weight. The cellular telephones which are in use today are compact enough to fit a person's pocket or purse.

While the new models enjoy increased portability, they do suffer from several drawbacks. For instance, their light weight and small size renders the telephones prone to falling, breaking, or simply being forgotten. Additionally, when a cellular telephone user receives a call, a time loss is experienced while the user locates and retrieves the telephone (which may be in her pocket, purse, brief case, etc.). An additional time loss is experienced when the user must adjust the phone's orientation to actuate an answer mode.

In order to overcome these drawbacks, cellular telephones which can be worn on the wrist of a user have also been developed. Some of these devices are described in U.S. Pat. Nos. 5,239,521; 5,274,513; 5,224,076. In all these disclosures a telephone device is typically in the form of a wristwatch fastened to the user's wrist via a strap, wherein a cellular phone mechanism replaces that of a watch in its conventional location. The main components of a cellular phone mechanism, such as transceiver, telephone call initiating means, a keyboard, a voice recognition device, a display, etc., as well as a battery power source, are accommodated within a common case. A microphone and a speaker are usually incorporated within the strap.

One of the problems which is experienced by the wrist-mounted cellular phones in the prior art is that they are difficult for a user to operate. For instance, some of the cellular telephone devices of the prior art remain attached to the user's wrist while the user is conducting a conversation. Thus, a user initiates a call by pressing the keypad of the device while the device is mounted to a wrist, then holds her wrist next to her ear in order to carry on a conversation. Because the microphone and speaker of the devices are fixed in a predetermined location on the device, the user is often required to hold his or her arm in an unusual position in order to line up the microphone and speaker with his or her mouth and ear, respectively. Alternatively, some of the cellular telephone devices of the prior art detach entirely from the wrist of a user, thus requiring that the device be removed from the user's wrist prior to initiating or receiving a telephone call.

In addition, the decrease in size of the cellular phone to that which can comfortably be worn on a person's wrist typically results in a corresponding decrease in the overall size of the keypad of the cellular phone. The small overall size of the keypad in turn requires that the keys of the keypad be smaller and/or closer in proximity. The small, closely spaced keys are difficult for a user to operate, in that the wrong keys may be inadvertently pressed.

A challenging aspect of wrist phone technology design is the antenna section. Typically, prior art wrist phone systems employ an antenna that is located adjacent or very close to the user's skin. In many instances the location of such antennas may lead to unnecessary signal losses. In order to avoid such losses, many users find out that for some or all of their calls they need to remove the wrist phone system from their wrist area: defeating an important purpose of such phones.

Thus, a need exists for an improved wrist-worn cellular telephone device, with improved antenna technology.

SUMMARY OF THE INVENTION

It is thus a major object of the invention to eliminate the above listed and other disadvantages of conventional wrist-mounted cellular telephone devices and provide a novel wrist-mounted telephone device.

It is a further object of the invention to provide such a device wherein all main components of a cellular phone mechanism are configured to be attached to the user's wrist.

There is thus provided according to one aspect of the present invention a wrist-mounted telephone device for attaching to a wearer's wrist. According to one embodiment, the device comprises a wristband configured to be attached to a wearer's wrist, wherein the wristband is configured to support a cellular phone mechanism. The device also comprises a keypad attached to the wristband and coupled to the cellular phone mechanism so as to provide signals to the cellular phone mechanism. The keypad, in accordance with various embodiments of the invention, has a plurality of adjustable sections.

The device also comprises a handset, which is removably mounted to either the wristband or the keypad. The handset comprises at least one section, and has a microphone and a speaker. Advantageously, the handset comprises two or more sections which extend telescopically or fold so that, in a closed position, the handset requires a minimum of space and can easily be connected to the wristband or keypad. In the open position, the handset expands so that the microphone is disposed on one end of the handset while the speaker is disposed on the other end, and the distance between the microphone and speaker is approximately the same as the distance between a user's ear and mouth. The handset may be either wired to the wristband or may be wirelessly connected thereto.

Preferably, the keypad comprises buttons, which when pressed, send corresponding signals to the cellular phone mechanism. In one embodiment of the invention, the keypad comprises a plurality of pressure sensitive switches that employ pressure transducers so as to operate as key elements of a keypad. As a result, the keypad in accordance with this embodiment of the invention can be made substantially thin and flexible.

The keypad may comprise one or more sections. In one embodiment, all of the keys of the keypad are located on the wristband. In another embodiment, only some of the keys of the keypad are located on the wristband, and the remaining keys are disposed on at least one additional keypad section which is attached to the wristband or cellular phone mechanism, enabling additional space to be provided between keys for easier dialing. In still another embodiment, all of the keys of the keypad are located on additional keypad sections which are coupled to the cellular phone mechanism.

Each keypad section may be attached to the wristband or cellular phone mechanism by a hinge or may be slidably attached to the wristband or cellular phone mechanism via at least one rail guide so as to extend telescopically therefrom. In those embodiments in which more than one keypad section are employed, sections of the keypad may also be coupled together by hinge so as to fold or by internal disposed parallel guides so as to extend telescopically.

Advantageously, additional keypad sections are rotatably attached to the first keypad section so as to conceal the buttons on each of the first and second sections when the second section is pivoted relative to the first section into a closed position. It is also preferred that the second section is pivotably attached to the first section so as to form a flat keypad when the second section is pivoted relative to the first section into an open position.

Preferably, the device also includes a transceiver for transmitting and receiving wireless communication signals, and an antenna, which may be telescopically extendable. The device may also comprise an indication means responsively coupled to the cellular phone mechanism for alerting, the wearer of an incoming call. The indication means preferably comprises a vibrator in the form of a mechanical assembly including a reciprocating prong for prodding the wearer's wrist.

The device may also comprise at least one data display panel. Preferably, the device also comprises a watch unit. According to one embodiment, the watch unit, at least portions of the keypad or portions of the phone mechanism are disposed in a diametrically opposite relationship on the wearer's wrist.

In accordance with another embodiment of the invention, the device includes a moveable antenna that extends outwardly from the device. Advantageously a hinge or pivot mechanism is employed that allows the antenna to rotate in a direction away from the horizontal plane of the device. The antenna may have multiple expandable sections, such as those employing telescopic mechanisms.

In accordance with another embodiment of the invention, at least a first and second antenna are employed, wherein at least one of the antennas is moveable in a direction away from the horizontal plane of the device. During operation, the position of the two antennas with respect to each other is adjusted so that the antennas provide polarization diversity that allows the reception of signals by the device to be insensitive to its orientation.

BRIEF DESCRIPTION OF THE DRAWINGS

In order to understand the invention and to see how the same may be carried out in practice, several preferred embodiments will now be described, by way of example only, with reference to the accompanying drawings, in which:

FIGS. 2(a) and (b) illustrate side views of a wrist communication device with a detached handset, in accordance with one embodiment of the present invention;

FIGS. 3(a) and (b) illustrate front views of a wrist communication device, in accordance with one embodiment of the present invention;

FIGS. 4(a), (b), (c) and (d) show a wrist communication device having a foldable, multi-sectioned keypad, in accordance with one embodiment of the present invention;

FIGS. 7(a), (b) and (c) illustrate a wrist communication device having a handset with a telescopically extendable antenna, in accordance with one embodiment of the present invention;

FIGS. 9(a), (b), (c), (d) and (e) illustrate a wrist communication device having a handset with a telescopically extendable antenna, in accordance with still another embodiment of the present invention;

FIGS. 10(a) through 10(e) illustrate a wrist communication device having a small detachable handset with a speaker and a microphone mounted on the wristband, in accordance with still another embodiment of the present invention;

FIGS. 11(a) and (b) illustrates a wrist communication device having a larger detachable handset with a speaker and a microphone mounted on the wristband, in accordance with another embodiment of the present invention;

FIGS. 12(a), (b), (c), (d) and (e) illustrate a wrist communication device wherein a handset is mounted separate from the cellular phone mechanism, in accordance with another embodiment of the present invention;

DETAILED DESCRIPTION OF THE PREFERRED EMBODIMENTS

Figure 1A:
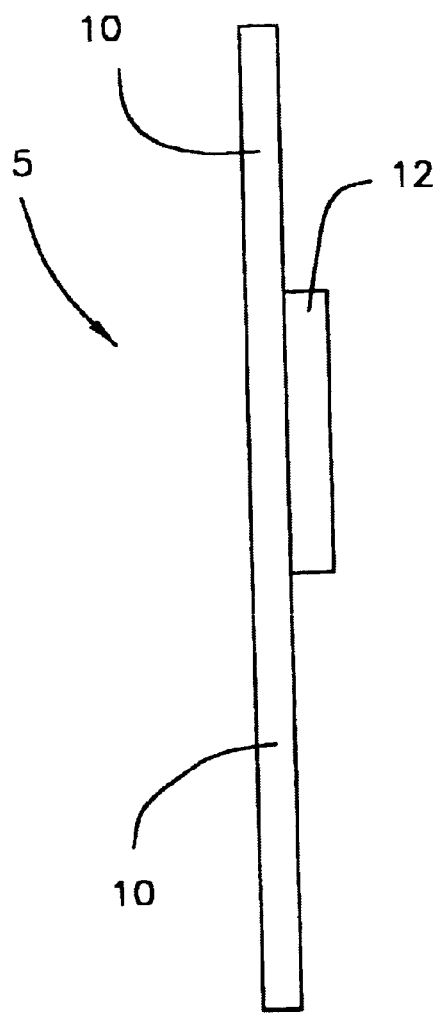
FIGS. 1(a) and (b) illustrate a wrist-worn communication device in a closed position, in accordance with one embodiment of the present invention.

FIGS. 1(a) and (b) illustrate a wrist worn communication device 5, in accordance with one embodiment of the present invention. FIGS. 1(a) and (b) show device 5 when device 5 is not being operated. Wrist communication device 5 is advantageously slim and lightweight, so as to minimize the likelihood that it will get caught on the user's clothing or otherwise interfere with the user's activities. Specifically, FIG. 1(a) shows a side view of wrist communication device 5, which comprises wristband 10 and handset 12. Wristband 10 is preferably flexible so as to be worn around a user's wrist and advantageously has a fastening device at each end so as to securely attach the device to the user's wrist.

Figure 1B:
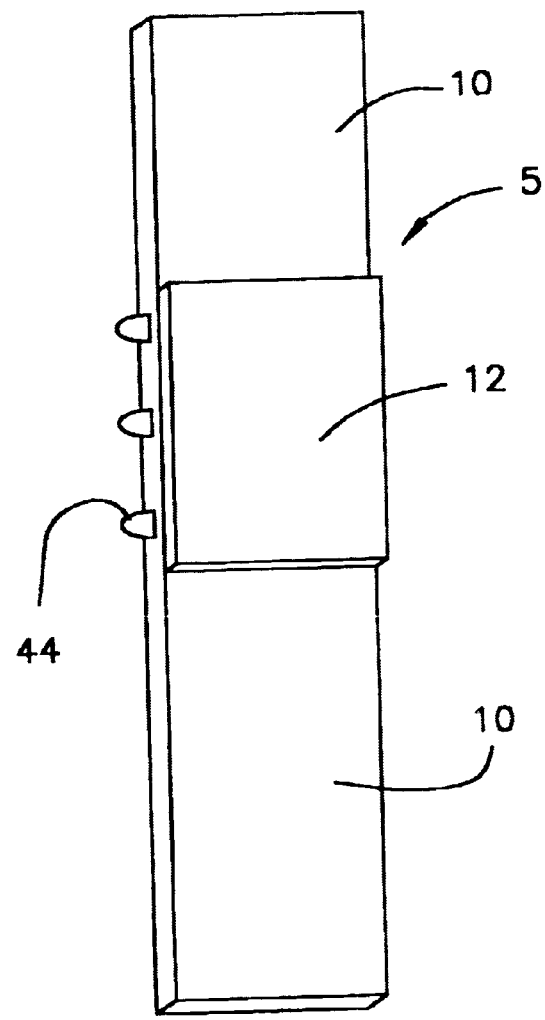

FIG. 1(b) shows a front view of wrist communication device 5. Device 5 may also comprise additional function buttons 44 positioned on the side of cellular phone mechanism 20 and along the edge of wristband 10. Buttons 44 may, according to one embodiment, enable the user to initiate a call, terminate a call, operate a menu displayed by a display unit, etc, as will be further displayed below.

FIGS. 2(a) and (b) illustrate side view s of wrist communication device 5. In FIG. 2(a), handset 12 is removed from wrist communication device 5, expo sing cellular phone mechanism 20, which is noted may be positioned anywhere on wrist communication device 5. Cellular phone mechanism 20 remains attached to wrist communication device 5 and may comprise a transceiver, display unit and other typical features of a cellular telephone device, as will be discussed in greater detail below. In one embodiment, cellular phone mechanism 20 is equipped with Internet browser technology, such as the Wireless Application Protocol (also referred to as "WAP"), so as to enable a wearer to use Internet applications. In one embodiment, both handset 12 and cellular phone mechanism 20 have batteries which supply power thereto. As previously mentioned, the battery of cellular phone mechanism 20 may be located anywhere on wristband 10. However, in one embodiment, wrist communication device 5 is configured such that a battery in cellular phone mechanism 20 also supplies power to the battery of handset 12, such as for charging purposes.

According to some embodiments, when wristband 10 is worn by a user, keypad and display sections of cellular phone mechanism 20 may be located on either the palm or the forearm sides of the user's wrists. It is important to note, however, that while various figures herein show cellular phone mechanism 20 as a single unit which is disposed on only one side of the user's wrist, the present invention is not limited in scope in that regard. Various portions of cellular phone mechanism 20, which includes the battery, transmitters, receivers, microprocessors, I/O units, antennas, etc., may instead be disposed at various locations around the wrist so as to maximize the usage of space on wristband 10.

According to various embodiments of the invention and as shown in FIG. 2(a), handset 12 may be wired to cellular phone mechanism 20 via wire 30 so as to transmit and receive communication signals thereto. In this embodiment, an antenna for receiving communication signals (which will be shown in figures discussed below) is located on handset 12. Alternatively, handset 12 and cellular phone mechanism 20 may have a wireless relationship whereby communication signals are transmitted therebetween via radio waves, as will be further discussed below.

In a preferred embodiment, wire 30 is retractable so that it does not hang loose when handset 12 is mounted on wrist band 10. In one embodiment, in addition to transmitting signals between handset 12 and cellular phone mechanism 20, wire 30 may itself function as an antenna which is configured to receive and transmit external communication signals, such as cellular communication signals to and from a base station.

The length of the wire determines the maximum distance between the handset and the wrist band. If handset 12 is wirelessly connected to cellular phone mechanism 20, the user will not be so restricted. Thus, a wireless connection between cellular phone mechanism 20 and handset 12 is advantageous in this respect, since a wired connection may render it awkward for the user to switch hands while speaking or to hand the phone to another person who desires to speak. However, the wireless connection has the requirement that handset 12 and cellular phone mechanism 20 have an additional transceiver, so that external communication signals (for example, the signals generated by a cellular base station) can be transmitted and received by one transceiver and internal signals (i.e.—the signals between cellular phone mechanism 20 and handset 12) can be received by another.

According to one embodiment of the invention, handset 12 has two telescopically extendable handset sections, 12a and 12b, part of which have a very small thickness. A speaker unit 14 is disposed on one end of handset section 12a, while a microphone 16 is disposed on an opposite end of handset section 12b. Telescopically extendable handset sections 12a and 12b slidably engage relative to each other via guides (such as parallel guides or a rail guide) between an open position and a closed position, such as by traveling along one or more guides 12d provided internal to one of the sections. In FIG. 2(a), handset 12 is shown in the closed position. In the closed position, handset 12 has a small length, and occupies a small amount of space, thus rendering it easy to store between uses on wristband 10.

Figure 2C:
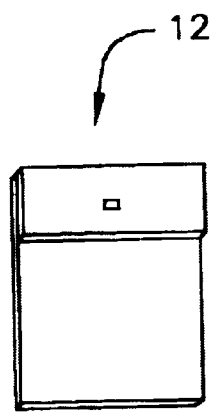
FIGS. 2(c) through (f) illustrate a handset for use with a wrist communication device with a detached handset, in accordance with various embodiments of the present invention.
Figure 2D:
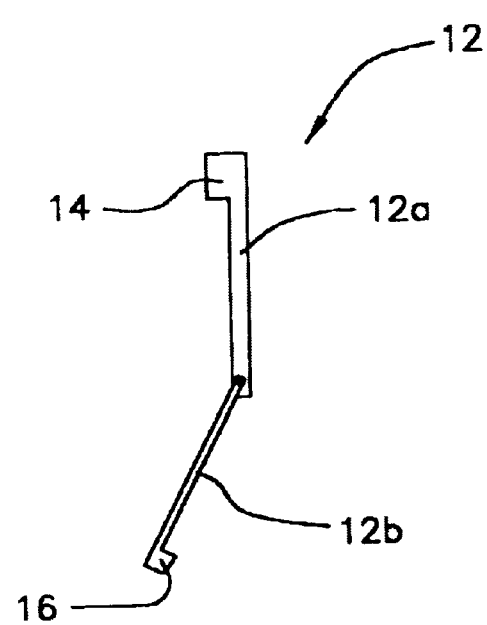
Figure 2E:
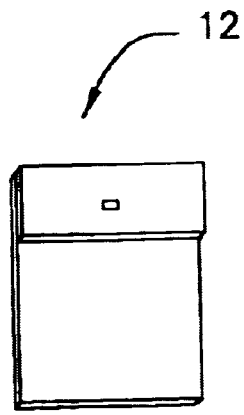
Figure 2F:
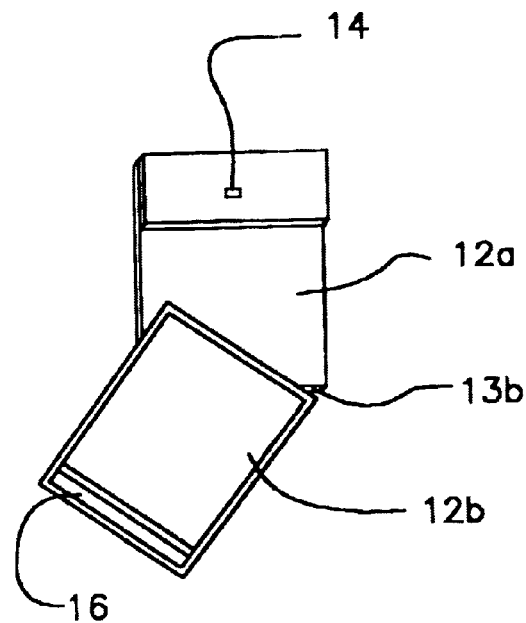

In FIG. 2(b), handset 12 is shown in an open position. In the open position, handset 12 has a longer length than in the closed position. Thus, in the open position, speaker 14 and microphone 16 are in closer proximity to the typical user's ear and mouth during usage, although the invention is not limited in scope in this regard. For example, as shown in FIGS. 2(c) and (d), sections 12a and 12b of handset 12 may also fold around a linear hinge 13 in order to achieve the same extendability, or else, as shown in FIGS. 2(e) and (f), may rotate around pivot 13b. Still other embodiments of the invention, having different configurations of handset 12, are discussed below, and the present invention contemplates that sections 12a and 12b may be extended by other means known in the art.

Returning to FIGS. 2(a) and 2(b), an additional feature of handset 12 is the perpendicular extension region 32a and 32b of handset 12 at speaker unit 14 and microphone 16, respectively. When handset 12 is in the open position, extended regions 32a and 32b enable speaker unit 14 and microphone 16 to be held closer to the user's ear and mouth during operation. Extended regions 32a and 32b of handset 12 are also configured such that, when handset 12 is in the closed position, the extensions frictionally engage a corresponding mating region on wristband 10. Depending on the arrangement of handset 12, speaker unit 14 and microphone 16 may be disposed on these perpendicular extensions, as shown in FIGS. 2(a) and 2(b), or may be disposed elsewhere on handset 12, as shown in FIGS. 2(c) and 2(d). In one embodiment of the invention, handset 12 is hermetically sealed to provide protection from water, dust, etc.

FIGS. 3(a) and (b) are similar to FIGS. 2(a) and (b), except that FIGS. 3(a) and (b) illustrate front views of wrist communication device 5. As in FIGS. 2(a) and (b), handset 12 is shown in FIGS. 3(a) and (b) to have two telescopically extendable handset sections, 12a and 12b, comprising speaker 14 and microphone 16, respectively. In FIG. 3(a), handset 12 is shown removed from wrist communication device 5, exposing portions of cellular phone mechanism 20.

In this view, additional features of cellular phone mechanism 20 are shown, such as keypad section 18, and portions of display unit 22. According to one embodiment of the invention, keypad section 18 folds over cellular phone mechanism 20, as shown in FIG. 3(a). Additional embodiments in which keypad 18 has a plurality of sections are discussed in detail below.

As previously mentioned, FIG. 3(a) also shows a portion of display 22, which can be viewed when handset 12 is detached from wristband 10. Display 22 may be a liquid crystal display. Advantageously, display 22 is configured to display a number currently dialed by the user when transmitting an outgoing call from the device, a number of a remote telephone device generating an incoming call (if such option is authorized by an owner of the remote telephone), a date or time, etc.

Preferably, and as shown in FIG. 4(a) and in other figures which will be explained below, display 22 is large in size. Thus, according to other embodiments of the present invention, display unit 22 is large enough to display a menu for selection by a user or to display Internet applications. In one embodiment, when cellular phone mechanism 20 is equipped with Internet browser technology, such as "WAP", display 22 is configured to display data from the Internet, such as stock prices, weather and traffic reports, driving directions, etc.

As illustrated in FIGS. 11(b), 3(a) and 4(a) (and various other embodiments, some of which are discussed below) display 22 may be covered in its entirety by handset 12 when handset 12 is mounted on wristband 10. For instance, in FIG. 1(b), no part of display 22 is visible when handset 12 is in the closed position. Similarly, in FIGS. 5(a) through 5(c), which will be explained in greater detail below, display portion 22b is only visible to a user when keypad section 18b is rotated into the open position. The full display, including the larger region of display portion 22, is only visible when keypad section 18a is telescopically extended into the open position.

Figure 14:
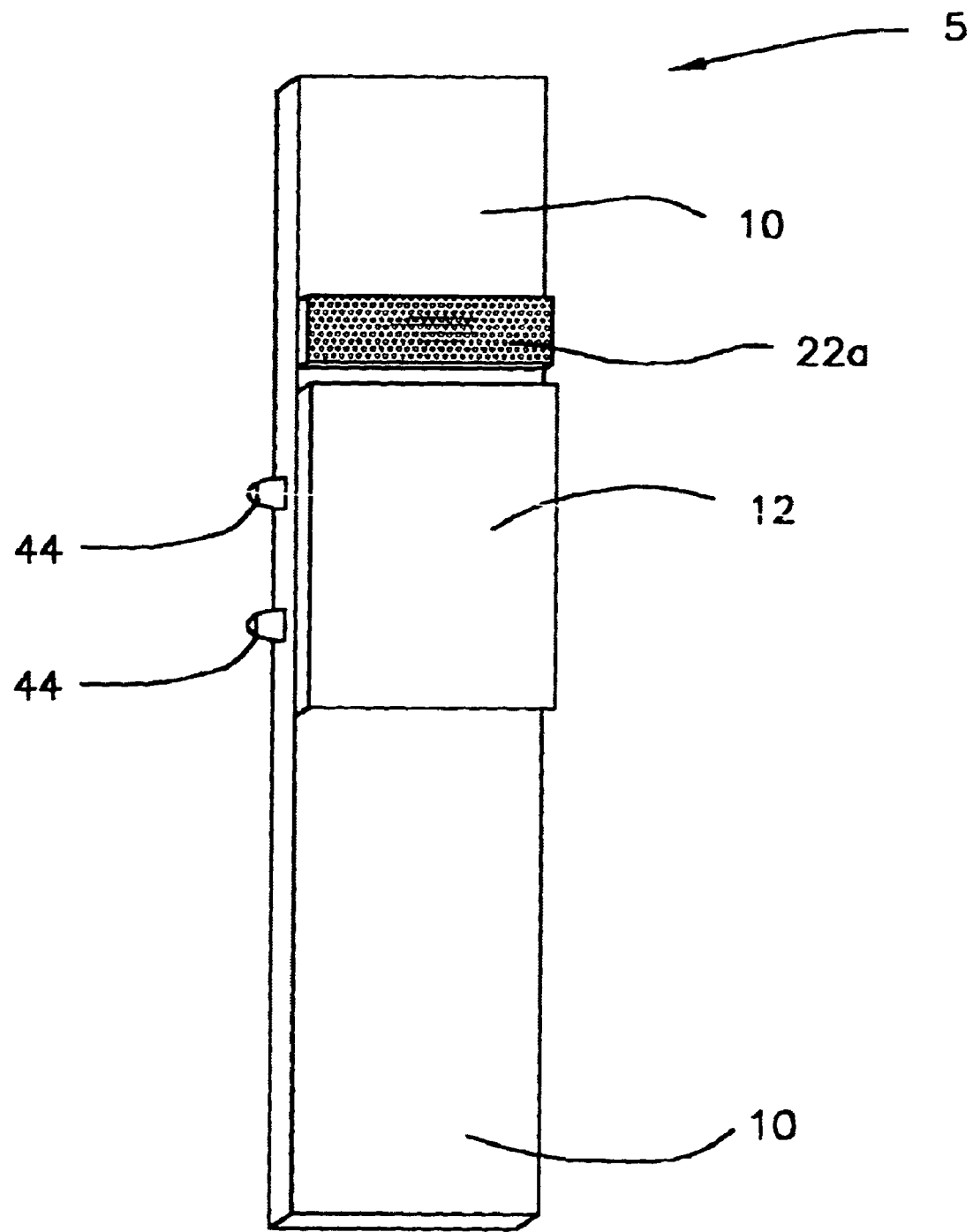
FIG. 14 illustrates a wrist communication device having a portion of a display unit which is permanently visible, in accordance with one embodiment of the present invention.

The present invention, however, also contemplates embodiments in which a portion of display 22 is permanently visible to the user. For instance, FIG. 14 illustrates one embodiment in which display portion 22a is permanently visible to the user. While display portion 22 is shown as being relatively small in FIG. 14, other embodiments may employ a larger display 22, some or all of which is visible to the user. According to various embodiments, having at least a portion of display 22 permanently visible enables a user to perform various functions without removing handset 12 or otherwise manipulating wrist communication device 5. For instance, the permanently visible portion of display 22 may display the date and time, the telephone number of an incoming call, a telephone number directory, etc.

As previously mentioned, FIGS. 1(b) and 2(a) are front views which show wrist communication device 5 in a partially-closed position. This configuration is likely to be worn by the user when the device is not in operation. FIG. 4(a) shows wrist communication device 5 when a first section 18a of keypad 18, which is coupled to cellular phone mechanism 20, has been rotated around hinge 21 and is in an open position. FIG. 4(b) shows wrist communication device 5 in a fully open position, i.e.—when both first section 18a and second section 18b of keypad 18 are in open positions. Section 18b of keypad 18 is coupled to section 18a via hinge 23, and rotates around hinge 23 in order to be in the fully opened position (other methods, such as sliding section 18b over section 18a, are further discussed below).

FIG. 4(c) shows the same embodiment with handset 12 detached for operation. FIG. 4(d) shows handset 12 detached from wristband 10 and extended to its full length.

As shown in FIG. 4(b), when wrist communication device 5 is in a fully open position, keypad sections 18a and 18b form a substantially flat surface for easy manipulation of the keys by the user. Buttons 42 are arranged on keypad 18 in a well-known manner, such as on an ordinary telephone, and are spaced sufficiently far apart so as to minimize the likelihood of the user inadvertently pressing buttons which the user does not intend to press. Keypad sections 18a and 18b both have disposed thereon buttons 42 which the user presses in order to operate the wrist communication device 5. Specifically, keypad 18 is electrically coupled to cellular phone mechanism 20 of device 5 and sends signals to cellular phone mechanism 20 corresponding to the buttons which are pressed by the user.

FIG. 4(b) also shows handset 12 mounted to keypad section 18a. As previously mentioned, the perpendicularly extended regions 32a and 32b of handset 12 frictionally mount onto keypad section 18a. FIGS. 4(c) and 4(d), on the other hand, shows handset 12 detached from keypad section 18a for operation by the user.

Various other embodiments of wrist communication device 5 are also possible. For instance, those elements of wrist communication device 5 which are foldable may instead be telescopically extendable, or may be adjustable by any other means. Similarly, those elements of wrist communication device 5 which are telescopically extendable may be foldable instead (or otherwise adjustable).

Figure 5A:
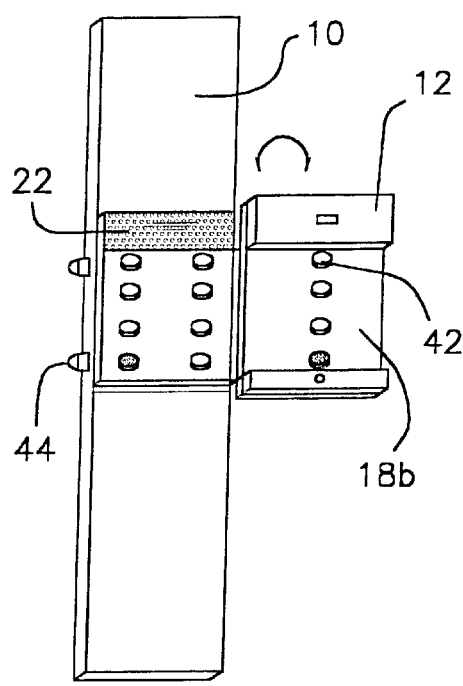
FIGS. 5(a), (b), (c) and (d) illustrate a wrist communication device with a telescopically extendable keypad, in accordance with one embodiment of the present invention.
Figure 5B:
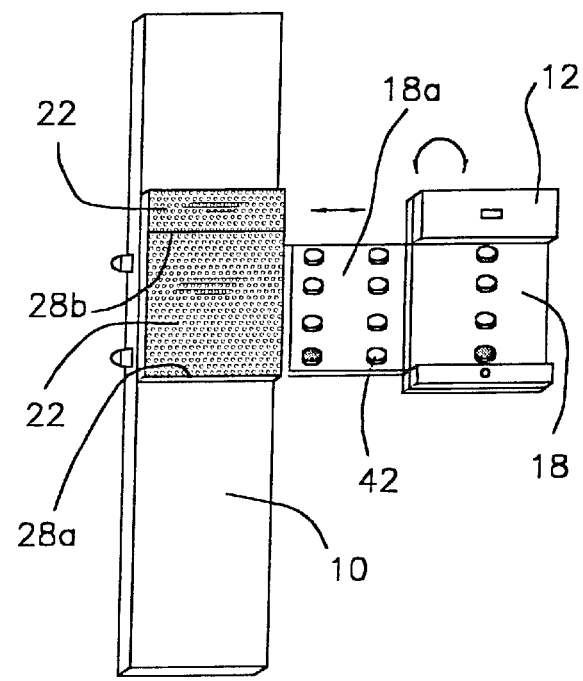
Figure 5C:
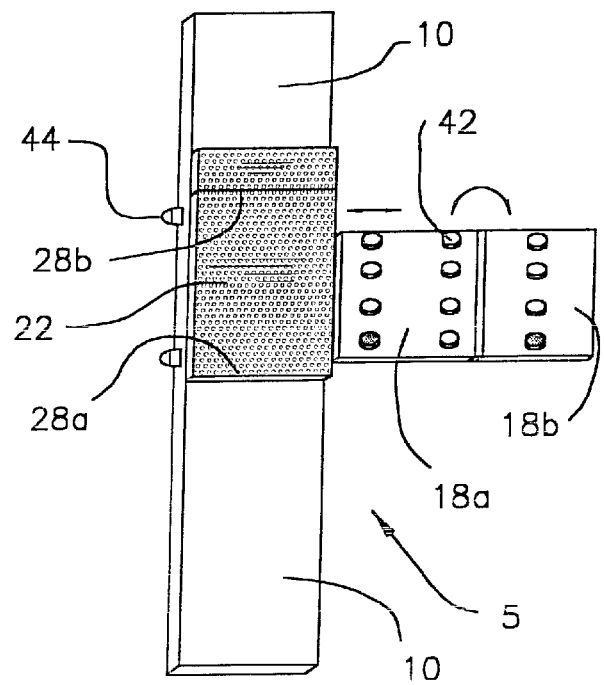
Figure 5D:
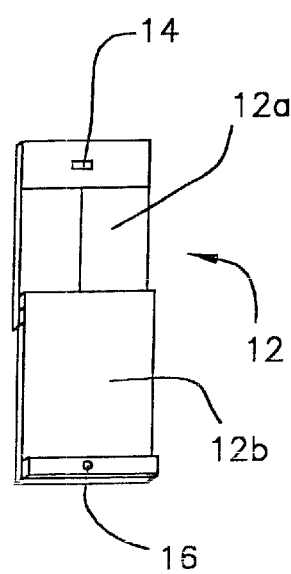

Similarly, FIGS. 1 through 4 show keypad section 18a coupled to wristband 10 via hinge 21, such that keypad section 18a may be folded over display 22. FIGS. 5(a), (b), (c) and (d) illustrate another embodiment, in which keypad 18 extends telescopically from wristband 10. According to this embodiment, in a closed position, keypad 18 is disposed on cellular phone mechanism 20, as is shown in FIG. 5(a). Keypad 18 travels along parallel guides 28a and 28b, as shown in FIG. 5(b), of cellular phone mechanism 20 to an open position. Preferably, in this embodiment (and any other embodiment in which two elements extend telescopically relative to each other) a bias spring (not shown) is employed so that a predetermined amount of force must be applied in order to return keypad 18 to the closed position after the element has been extended.

Specifically, in FIGS. 5(a), (b) and (c), keypad 18 comprises two sections, 18a and 18b. Keypad section 18a extends telescopically out from cellular phone mechanism 20. Keypad section 18b, on the other hand, is coupled to keypad section 18a via hinge 23, such that when keypad section 18a is in the closed position, keypad section 18b can be folded over onto keypad section 18a and cellular phone mechanism 20. In this embodiment, handset 12 is removably mounted (such as by a friction fit) to keypad section 18b so as not to restrict the telescopic movement of keypad section 18a and so that handset 12 is accessible to the user while keypad section 18a is in the closed position.

The present invention also contemplates that keypad section 18a is coupled to cellular phone mechanism 20 via a hinge and that keypad section 18b is coupled to keypad section 18a via a telescopically extendable relationship. The present invention, according to various embodiments, also contemplates that keypad 18 comprises other than two sections, wherein each section is coupled by any of the above-described means. For instance, wrist communication device 5 may comprise only one keypad section, which is either foldably or slidably connected to the device.

Figure 6:
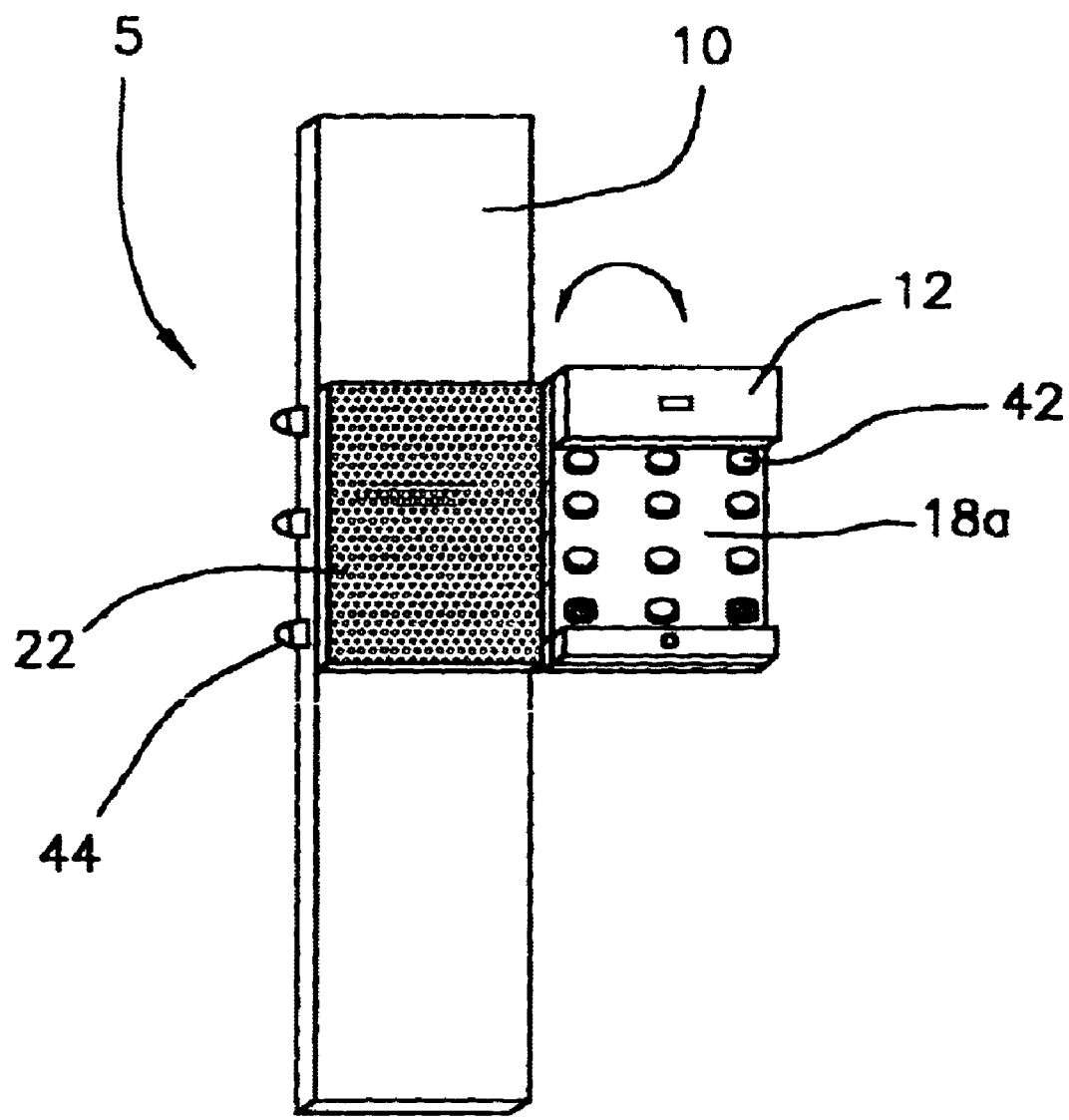
FIG. 6 illustrates a wrist communication device with one keypad section, in accordance with one embodiment of the present invention.

FIG. 6 illustrates another embodiment of the present invention which has a single keypad section 18a. In this case, all of the keys 42 are disposed on keypad section 18a. Although the keys are closer together, and therefore are more difficult to operate, this configuration permits wrist communication device 5 to have a slimmer profile than embodiments having two or more keypad sections. Again, handset 12 is removably mounted on keypad section 18a for ease of operation.

The use of a multi-sectioned keypad, such as the keypads of FIGS. 5(b) and (c) described above, have the advantage of permitting the buttons on the keypad to be spaced further apart, or to be larger in size, without increasing the overall size of the device and renedering it cumbersome for a user to wear on his or her wrist. Additional configurations of the multi-sectioned keypad, and a detailed explanation of the advantages afforded by each, are described in detail in Applicant's co-pending application Ser. No. 09/330,728, which is incorporated by reference herein as fully as if set forth in its entirety.

Generally, the use of a multi-sectioned keypad enables the size of the keypad when closed to be decreased so as to minimize the likelihood that the keypad will interfere with the user or be damaged. Additionally, multisectioned keypads conceal the keypad buttons and protect them from water, dust, etc. In a preferred embodiment, the buttons on each keypad section are positioned so as not to contact each other when section 18a is closed over section 18b. This embodiment decreases the combined thickness of sections 18a and 18b when closed, thus rendering wrist communication device 5 less bulky on a user's wrist, and limits the wear and tear on the buttons since they will not be pressed down upon when the device is in the closed position.

According to another embodiment, multi-sectioned keypad 18 is arranged as a membrane keypad. In this embodiment, the key elements employ touch actuated switches formed on a membrane. The structure and operation of membrane keypads are well-known and described for example in U.S. Pat. No. 3,987,259 or U.S. Pat. No. 4,489,302, which are incorporated herein by reference. Briefly, a plurality of electrodes are disposed over each other in a spaced-apart relationship. When any of the key elements are pressed, some of the electrodes establish an electrical connection that can result in a signal indicating the particular key element that has been pressed. In accordance with one embodiment of the invention, such membrane keypads are made of substantially flexible material, such as plastic.

As previously mentioned, wrist communication device 5 may also be configured, according to one embodiment of the invention, to have a wireless connection between handset 12 and cellular phone mechanism 20. For instance, FIGS. 7(a), (b) and (c) illustrate another embodiment in which handset 12 has a telescopically extendable antenna 25. FIG. 7(a) shows handset 12 removably mounted to wrist communication device 5, such as when the device is not being operated by a user. The width of handset 12 is approximately the same as the width of wristband 10.

FIG. 7(b) shows handset 12 detached from the device, in the closed position. FIG. 7(c) shows handset 12 in the open position. In the open position, sections 12a and 12b slide relative to each other, and telescopically extendable antenna 25 is extended in order to receive and transmit external communication signals. As previously mentioned, if antenna 25 is configured to receive external communication signals, handset 12 is advantageously wired to wrist communication device 5 to transmit signals therebetween.

Figure 8A:
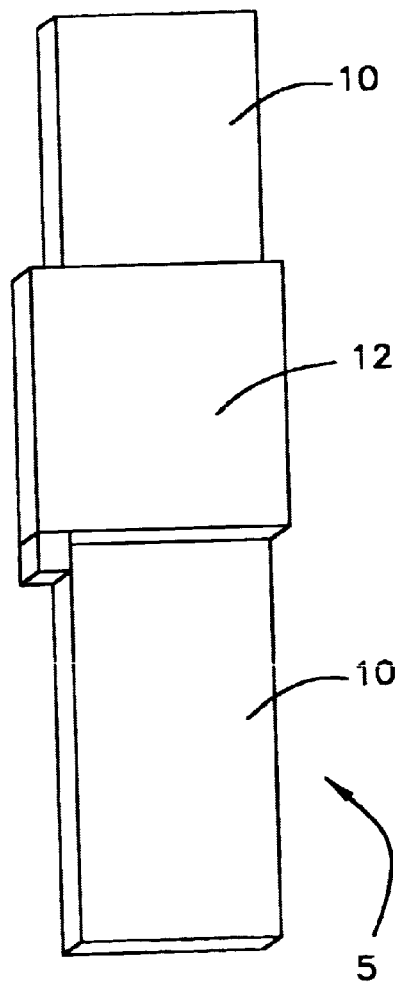
FIGS. 8(a), (b) and (c) illustrate a wrist communication device having a handset with a telescopically extendable antenna, in accordance with another embodiment of the present invention.
Figure 8B:
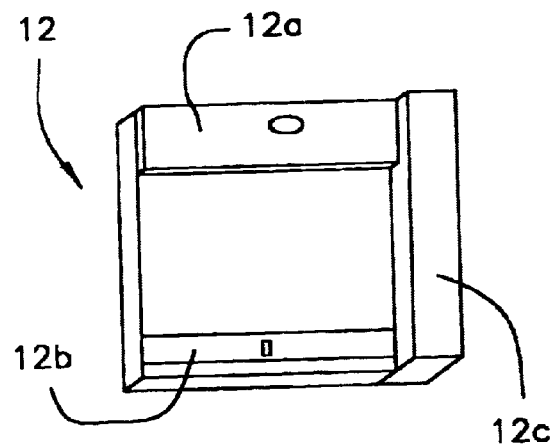
Figure 8C:
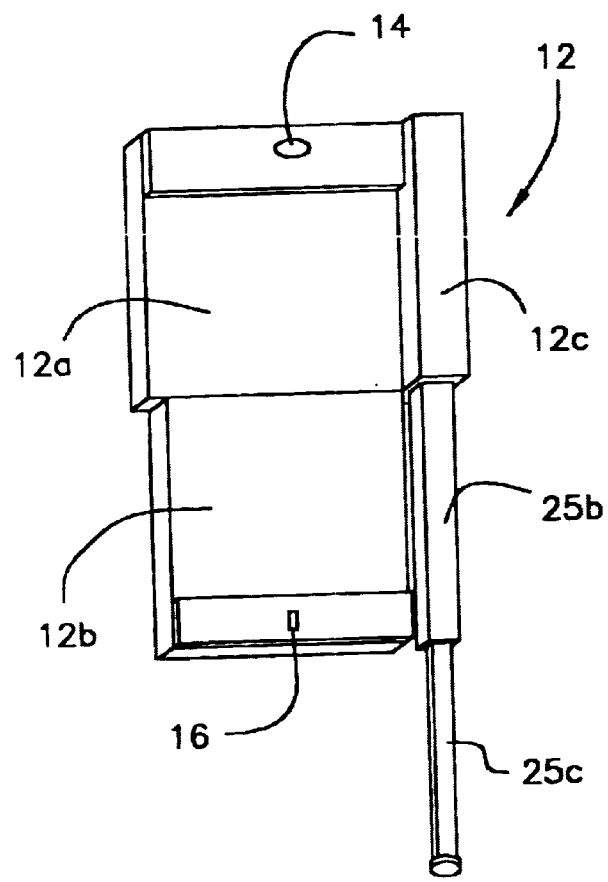

FIGS. 8(a), (b) and (c) illustrate still another embodiment in which handset 12 has a telescopically extendable antenna 25. FIG. 8(a) shows handset 12 removably mounted to wrist communication device 5, such as when the device is not being operated by a user. In this case, the width of handset 12 is slightly wider than the width of wristband 10, in order to accomodate an antenna housing 12c. FIG. 8(b) shows handset 12 detached from the device, in the closed position. FIG. 8(c) shows handset 12 in the open position. In the open position, telescopically extendable antenna 25 extends into antenna sections 25b and 25c, in order to provide improved reception and transmission of the communication signals. Of course, antenna 25 may be attached to either handset section 12a or 12b, and may extend in any direction depending on the handset's configuration.

The configuration of handset 12 in FIGS. 8(a) through (c) may also be employed in the embodiment of the invention illustrated in FIGS. 9(a) through (e). FIG. 9(a) shows wrist communication device 5 having keypad sections 18a and 18b. Keypad section 18a is telescopically extended over display 22. Keypad section 18b is coupled to keypad 18a via a hinge. Removably mounted to keypad 18b is handset 12. A full display 22 on wrist communication device 5 enables the user to view information such as the telephone number of the other party to the call, Internet data, etc.

FIG. 9(b) illustrates handset 12a removed from keypad section 18b. It also shows keypad section 18a which is configured to slide over display 22 via parallel guides 34a and 34b. As shown, keypad section 18a is not as wide as cellular phone mechanism 20. Thus, a portion of cellular phone mechanism 20, i.e.—display unit 22, remains uncovered. The width of the portion of cellular phone mechanism 20 left uncovered by when keypad section 18a is not telescopically extended corresponds to the width of antenna housing 12c of handset 12. When handset 12 is stored on wristband 10, antenna housing 12c fits into the space not occupied by keypad 18a, and thus enables wrist communication device 5 to have a slimmer profile.

FIG. 9(c) shows keypad section 18b which has been folded over keypad section 18a in order to minimize the size of the wrist communication device 5. FIGS. 9(d) and (e) also shows handset 12 in the closed and open positions, respectively. In FIG. 9(e), handset 12 is shown having telescopically extendable antenna 25 in an extended position. It is noted that antenna housing 12c may be located at any position on handset 12 and may be configured to frictionally mate with regions on wristband 10 that are unoccupied by additional features of wrist communication device 5.

Still another embodiment of the present invention is illustrated in FIGS. 10(a) through 10(e). FIG. 10(a) shows wrist communication device 5 in a closed position. FIG. 10(a) shows handset 12 which is very small in size. Handset 12 is mounted next to wire housing 38. In the embodiment shown, both handset 12 and housing 38 are positioned next to cellular phone mechanism 20, although the invention is not limited in scope in this respect. The figure also shows microphone 16, which is similarly configured on wristband 10. In this embodiment, microphone 16 is positioned on an opposite side of cellular phone mechanism 20 on wristband 10, though other positions are also contemplated.

FIG. 10(b) shows handset 12 detached from wristband 10, as a user would do when operating the device. Handset 12 comprises speaker unit 14, and is configured to be held between the user's fingers, such as between the user's thumb and forefinger. Handset 12 is connected to cellular phone mechanism 20 by wire 30, which advantageously retracts into wire housing 38. As previously discussed, wire 30 is configured to transmit communication signals between handset 12 and cellular phone mechanism 20.

To operate the device, a user detaches handset 12 from wristband 10 and holds it between his fingers, i.e.—with the same hand on which wrist communication device 5 is worn. The user then holds handset 12 up to his ear, so that the user can hear via speaker unit 14. Thus, wire 30 is long enough to reach from the position of wire housing 38 on the user's wrist to the tips of the user's fingers, and should be long enough to accomodate various different sizes of hands. With handset 12 positioned near his ear, the user then positions his wrist so that microphone 16, which is located on wristband 10, is near his mouth.

FIGS. 10(c) through 10(e) illustrate how keypad 18 and display 22 are configured on wrist band 10. For instance, FIG. 10(c) shows that, according to one embodiment of the invention, keypad 18 comprises two keypad sections 18a and 18b, which are separated by hinge 23. As in the previously described embodiments, keypad 18 is configured such that section 18b can be rotated and forms a flat keypad for the user to operate.

FIG. 10(d) shows keypad 18 in the closed position, but extended telescopically from cellular phone mechanism 20. As previously described, keypad 18 extends telescopically along parallel guides 28a and 28b disposed on cellular phone mechanism 20. When keypad 18 is extended, display unit 22 can be viewed by the user. Finally, FIG. 10(e) shows cellular phone mechanism 20 in a fully opened position, such that keypad section 18a is telescopically extended to allow display 22 to be viewed, and keypad section 18b is rotated around hinge 23 to provide a flat keypad.

FIGS. 11(a) and (b) illustrate another embodiment of the invention, which combines some of the features of the embodiments shown in FIGS. 1 and 10. For instance, FIGS. 11(a) and (b) illustrates handset 12, which is approximately the same size as the handset shown in FIGS. 1 through 10. At one end of handset 12 is speaker unit 14. A user detaches handset 12 from wristband 10 in the same manner as previously described so as to hold speaker 14 to his ear. In addition, FIG. 11(a) shows microphone 16 located on wristband 10, in this case contiguous with cellular phone mechanism 20. As described in connection with FIGS. 10(a) through (e), with handset 12 positioned near his ear, a user then positions his wrist so that microphone 16 is near his mouth.

In accordance with other embodiments of the invention, wrist communication device may also be configured in other ways to minimize the thickness of the wrist device. For instance, FIGS. 12(a) through 12(e) illustrate an additional embodiment in which handset 12 is detachably mounted along side of keypad section 18. Since handset 12 is not mounted on keypad section 18, wrist communication device 5 has a slimmer profile than is possible in other embodiments.

FIG. 12(a) shows handset 12 mounted on wristband 10 next to keypad 18. Handset 12 is held in place by parallel guides 40a and 40b. FIG. 12(b) illustrates handset 12 which slides relative to wristband 12 in order to be held by a user during operation. Handset 12 communicates, according to one embodiment of the invention, with wrist communication device 5 as previously discussed. FIG. 12(d) shows handset 12 in a first position, having just been slid out from its mounting location on wristband 10. FIG. 12(e) shows handset 12 rotated to show speaker unit 14. Advantageously, handset 12 is configured to be mounted on wristband 12 so that speaker unit 14 faces towards the user's wrist, thereby protecting the speaker from water, dust, etc., although the present invention is not limited in this regard.

FIG. 12(c), on the other hand, shows handset 12 which is telescopically extended. In this embodiment, handset 12 is comprised of four telescopically extendable sections, designated as 12a through 12d, although the present invention contemplates that any number of sections may be employed. In this case, handset section 12a comprises speaker 14, while handset section 12d comprises microphone 16. As previously mentioned, the extendability of handset 12 enables it to occupy less space when closed and mounted on wristband 10, while positioning microphone 16 and speaker 14 in a more desirable configuration for operation when in the open position.

Figure 13:
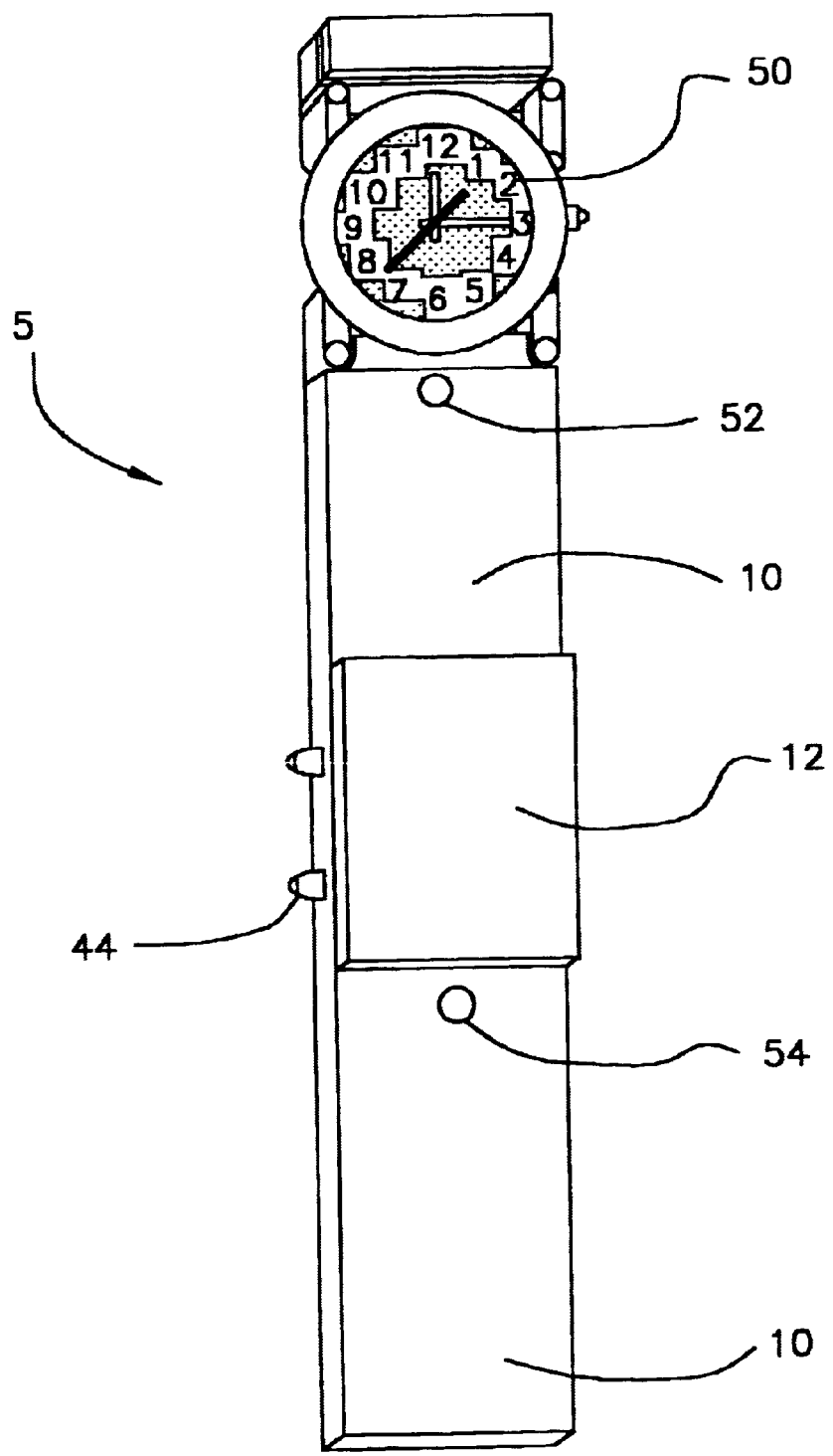
FIG. 13 illustrates a wrist communication device with an independent watch unit and an additional speaker and microphone, in accordance with one embodiment of the present invention.

According to another embodiment of the invention, wrist communication device 5 further comprises a watch unit that operates independently from cellular phone mechanism 20. For instance, FIG. 13 illustrates wrist communication device 5 comprising watch unit 50 mounted on wristband 10. Obviously, any means may be used to attach watch unit 30 to wristband 10. For example, the watch 30 may be mounted on, or integrally formed with, its housing which, in turn, may be coupled to wristband 10 by hinges or the like. Wrist communication device 5 may be configured to have watch unit 50 at any portion of wristband 10, such as, when worn by a user, on diametrically opposite sides of the user's wrist, in relation with portions of keypad 18 or display unit 22.

Referring to FIG. 13, wrist communication device may comprise handset 12, which operates in a manner discussed in the previously described embodiments. In other words, handset 12 is preferably detachable from wristband 10 in order to be held by a user during operation. FIG. 13 also shows additional speaker unit 52 and microphone 54. Additional speaker unit 52 and microphone 54 may be employed in several ways.

For instance, additional speaker unit 52 may be employed, according to one embodiment of the invention, as a loud speaker, so that a user can listen to the other party of the call without placing device 5 to his ear. Advantageously, a user can activate a "hands-free" mode of operation so that the user can operate device 5 while performing other functions, such as driving. In this case, handset 12 remains mounted to wristband 10 while microphone 54 receives the user's voice and the voice of the other party to the call is audibly conveyed to the user via speaker unit 52.

Alternatively, speaker unit 52 and microphone 54 may be employed, according to another embodiment of the invention, to operate when handset 12 is broken or lost. In this way, wrist communication device 5 may be removed from the user's wrist and held in position (i.e.—with speaker unit 52 held in position near the user's ear and microphone 54 held in position near the user's mouth) like an ordinary phone.

Each of the devices shown in the previously described figures permit wrist communication device 5 to be operated in a unique and improved manner. For instance, the embodiment in FIG. 3(a) (among others) illustrates how a user may operate wrist communication device 5 when a call is received from another party. When a call is received, the user detaches handset 12 from device 5 and answers the call. The present invention, in accordance with various embodiments, enables the user to quickly detach the handset and speak into it without requiring the user to unfold keypad 18 or otherwise manipulate any keys on keypad 18 first. Of course, in one embodiment in which display 22 is configured to display the telephone number of an incoming call, the user may, if desired, first open keypad 18 to view display 22, and then detach the handset to answer the call.

On the other hand, FIGS. 4(a) and (b) (among others), illustrate how the user may operate wrist communication device 5 when the user desires to initiate a call, in accordance with one embodiment of the invention. Specifically, FIGS. 4(a) and (b) illustrates that handset 12 is removably mounted onto keypad 18, while keypad 18 is coupled to wristband 10 via hinge 21. In this manner, when a user initiates a call, the user opens keypad 18 to expose keys 42 and display 22. This step is performed with handset 12 still mounted to keypad 18 of wrist communication device 5. In addition to stabilizing the keypad while the user presses the buttons, having handset 12 remain mounted during this step eliminates the need for the user to hold the handset in his or her hand while trying to dial the phone. Only after the buttons have been pressed and the call has been initiated does the user detach the handset and begin speaking. Of course, handset 12 is removably mounted to the device so that, if the user desires to detach the handset prior to operating the keypad, the user may do so.

One of the advantages of the wrist communication device of the present invention is that it is more comfortable to use than wrist communication devices of the prior art. This follows because the detachable handset allows the user to hold handset 12 in a position which is the most comfortable for him or her. By contrast, wrist communication devices of the prior art, which have the speaker and microphones in a fixed location on the device, force every user to adopt the same hand position, which may not be comfortable for all users. As shown in several of the embodiments, handset 12 has a shape which is comfortable for users.

Another advantage of the present invention is the ability of a user, in several embodiments, to switch handset 12 to a different hand if desired, without removing the device from his wrist. Similarly, the user has the ability, in several embodiments, to hand the telephone to a different person who wishes to speak to the caller, also without removing the device from his wrist.

Still another embodiment of the invention employs an antenna which extends away from the user's wrist. For instance, a problem which is typically experienced by wrist mounted communication devices is the close proximity of the antenna to the user's body. The close proximity of the antenna to the user's body causes the quality of the signals which are transmitted and received by the antenna to decrease. When a wrist mounted communication device is worn, its antenna is typically very close to the user's body due to the device's slim profile.

Figure 15A:
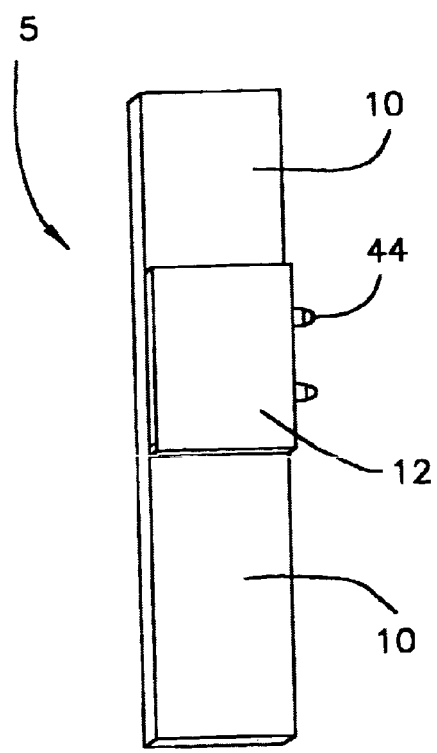
FIGS. 15(a)–15(g) illustrate a wrist communication device employing an antenna system in accordance with another embodiment of the invention.

FIGS. 15(a) through 15(e) illustrate one embodiment of the invention in which the antenna is extended away from the user's wrist in order to improve the quality of the signals which are transmitted and received by the antenna. FIG. 15(a) shows wrist communication device 5 in a closed position, wherein handset 12 is detachably mounted on wristband 10, although the invention is not limited in scope in that respect. For example, the antenna system illustrated in FIGS. 15(a)–15(e) may be employed in other wrist phone communication devices as well. It is noted that wrist band 10 of communication device 5 may be made from a variety of materials, such as plastic, leather or metal. In accordance with one embodiment of the invention, the back cover of handset 12 is made of the same material as the wrist band so that when it is in the closed position, the entire communication device 5 appears in a uniformly integrated arrangement.

Figure 15B:
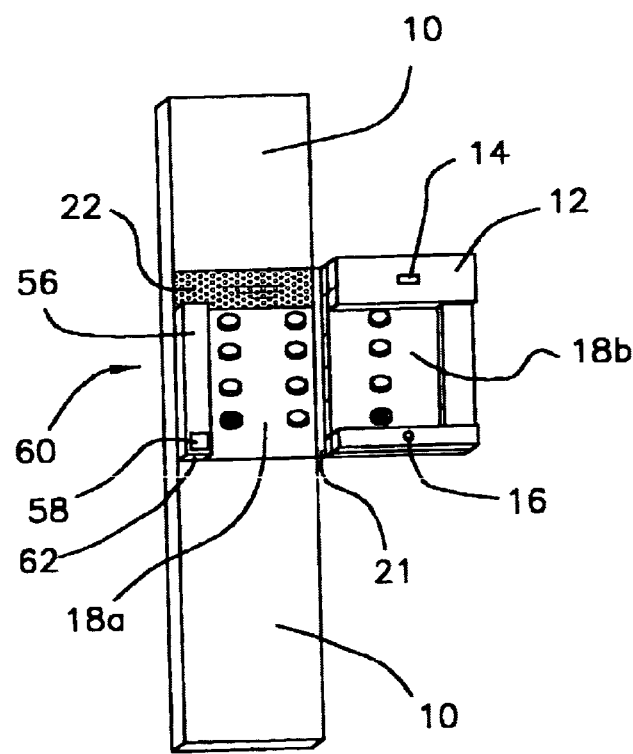

FIG. 15(b) illustrates wrist communication device 5 in a partially open position. In this case, keypad section 18b is rotated around hinge 21. Handset 12 is configured to fit on keypad section 18b, such as by a friction fit. The width of keypad section 18a is configured to be smaller than the entire width of communication device 5 so as to allow space for an antenna system 58. In accordance with one embodiment of the invention, antenna system 58 includes an antenna 56, which is disposed near keypad 18a, and preferably adjacent to it. Preferably, the height of antenna 56 in its closed position is substantially the same as the height of keypad section 18b.

Antenna system 60 includes a hinge or pivot mechanism 62, so as to allow antenna 58 to open in a direction away from the horizontal plane of the wrist communication device. Pivot mechanism 62, in accordance with one embodiment of the invention, includes a spherical pivot 64 (FIG. 15(g)), which allows antenna 58 to rotate in any direction in a space above the horizontal plane of the wrist communication device for optimum reception.

Figure 15C:
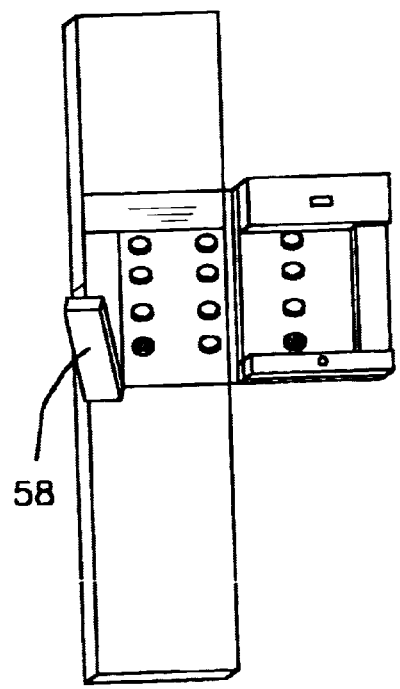

FIG. 15(c) illustrates antenna 58 in a retrieved position. As illustrated, antenna 58 extends away from the horizontal plane of the wrist communication device. It is noted that in accordance with one embodiment of the invention, antenna 58 is held in its closed position by a biasing mechanism, such as a spring bias, such that when keypad 18b is removed from keypad 18a, the biasing mechanism releases antenna 58 in a desired position, without the need for the user to do so.

Figure 15D:
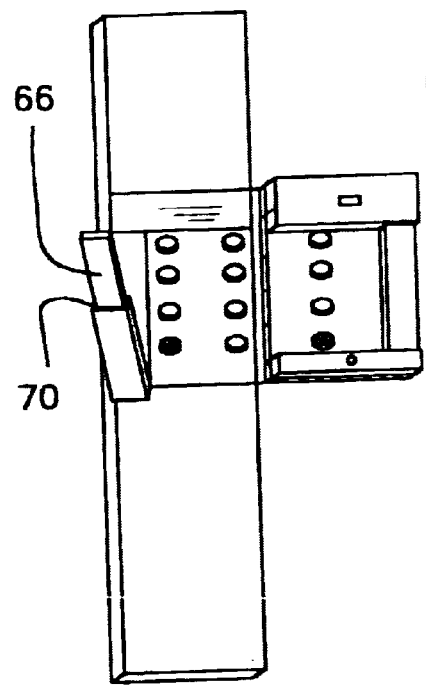
Figure 15E:
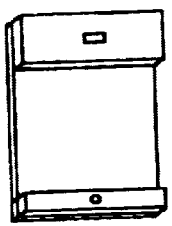
Figure 15F:
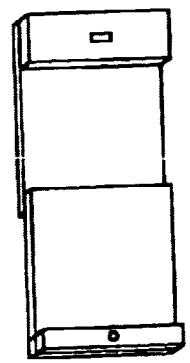
Figure 15G:
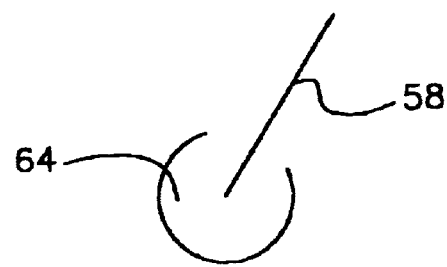

FIG. 15(d), illustrates antenna system 60 in accordance with another embodiment of the invention. As shown, an extension antenna 66 is telescopically extendable from antenna 58. In accordance with one embodiment, extension antenna 66 may be extended for better reception. Additionally, a pivot or hinge mechanism 70 allows extension antenna 66 to rotate about antenna 58.

In accordance with yet another embodiment of the invention, extension antenna 66 and antenna 58 are configured to operate independently as a diversity antenna. The operation of diversity antennas is well known, and is described for example in U.S. Pat. No. 5,564,082, issued Oct. 8, 1996, and incorporated herein by reference. Thus, when extension antenna 66 is rotated about antenna 58, the two antennas may be substantially uncoupled and independent of one another. If the antennas are driven with for example, orthogonally independent signals, the angular arrangement provides polarization diversity. The arrangement of extension antenna 66 in relation with antenna 58 improves transmission and reception, regardless of the position of wrist communication device 5.

Furthermore, in accordance with another embodiment of the invention, one of the antennas 58 or 66 may be employed for transmission, while the other one is employed for reception.

Figure 16A:
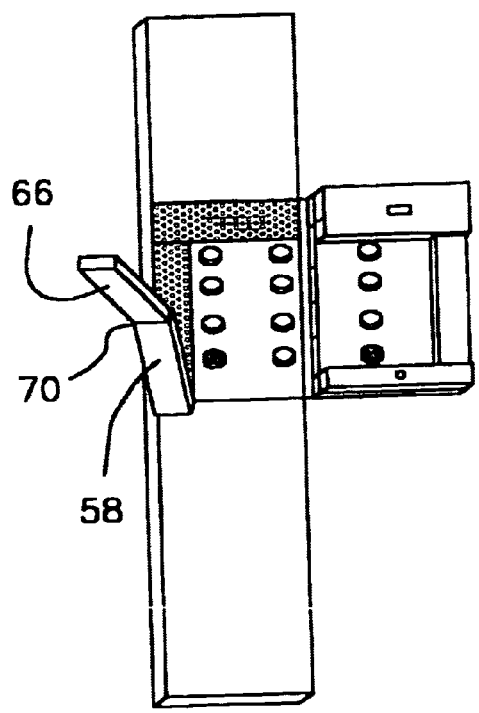
FIGS. 16(a)–16(b) illustrate a wrist communication device employing an antenna system in accordance with another embodiment of the invention.
Figure 16B:
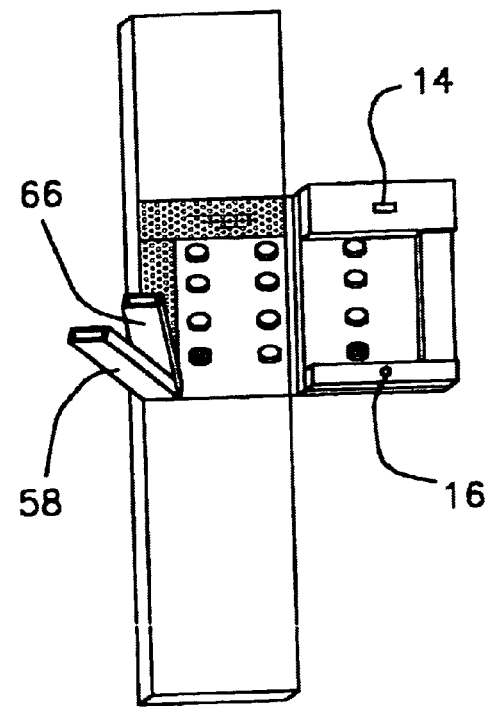

FIGS. 15(d) and 16(a) illustrate exemplary positions of extension antenna 66, while FIG. 16(b) illustrate an antenna system 60 comprising antennas 58 and 66, which are both coupled to wrist communication device 5 at one of their ends. Antennas 58 and 66 are both extendable away from the horizontal plane of communication device 5.

Figure 17A:
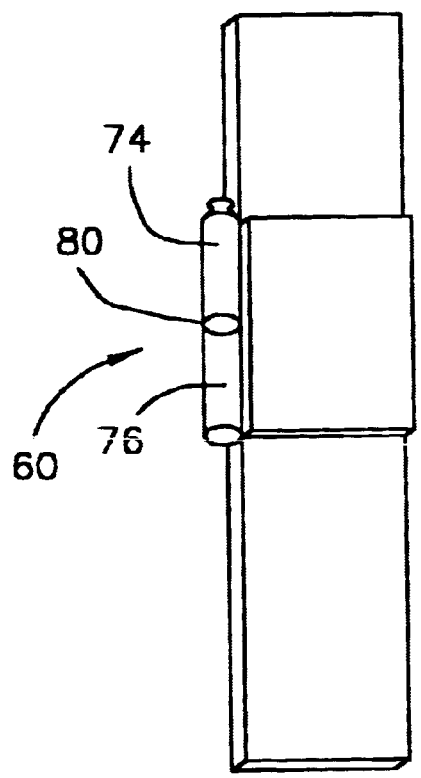
FIGS. 17(a)–17(b) illustrate a wrist communication device employing an antenna system in accordance with yet another embodiment of the invention.
Figure 17B:
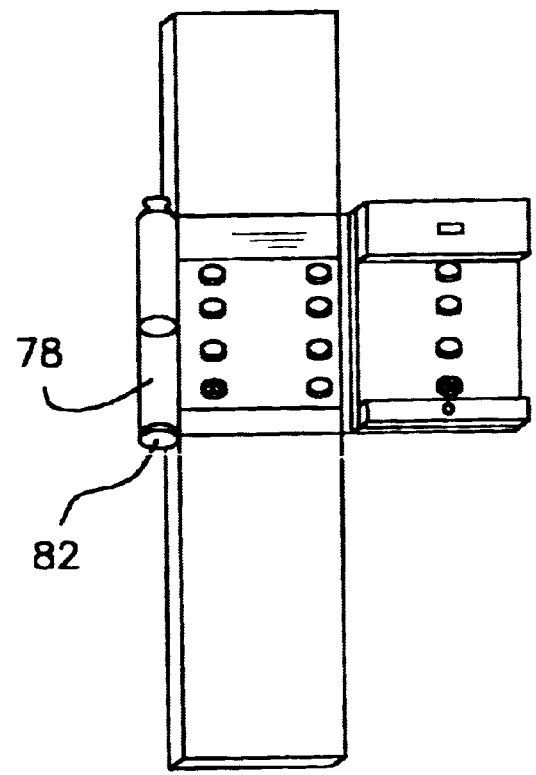

FIGS. 17(a) and 17(b) illustrate another embodiment of antenna system 60, in accordance with the principle of the present invention. Antenna system 60 comprises two antennas 74 and 76 which are attached outside the keyboard area of communication device 5. Each of the antennas 74 and 76 are extendable away from communication device 5 via pivot mechanism 80. Antennas 74 and 76 may be part of one antenna, or may operate as two independent antennas as discussed above in reference with diversity antenna arrangement.

Figure 18A:
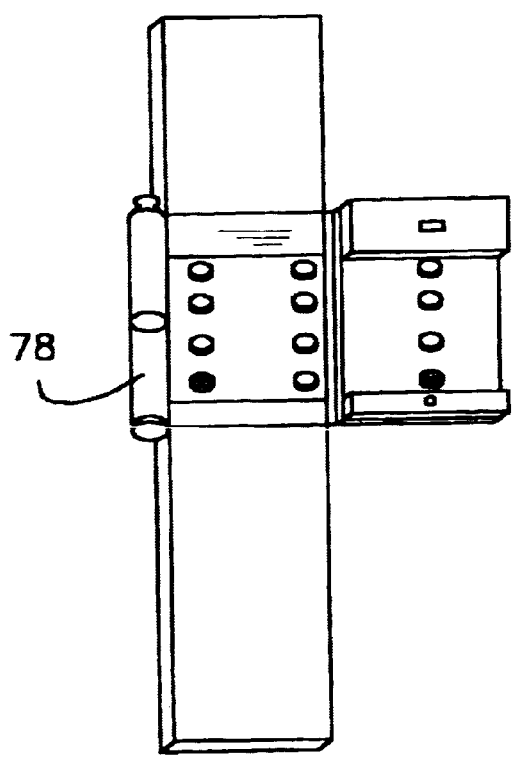
FIGS. 18(a)–18(b) illustrate a wrist communication device employing an antenna system in accordance with another embodiment of the invention.
Figure 18B:
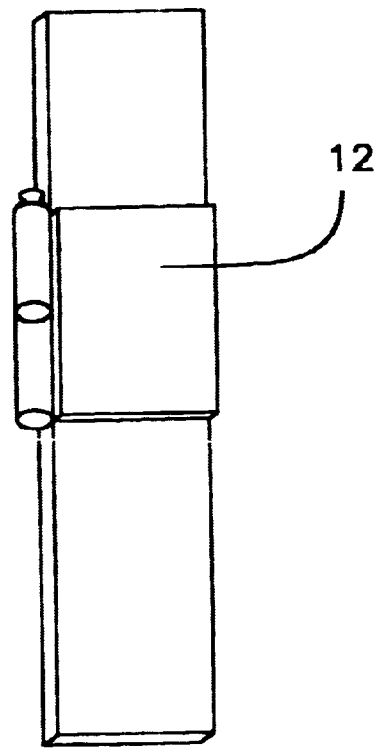

FIG. 17(b), on the other hand, illustrates antenna 78, which extends away from communication device 5 via a pivot mechanism 82. FIGS. 18(a) and 18(b) illustrates another embodiment of the invention, wherein handset 12 completely covers antenna 78 when it is in a closed position.

Figure 19A:
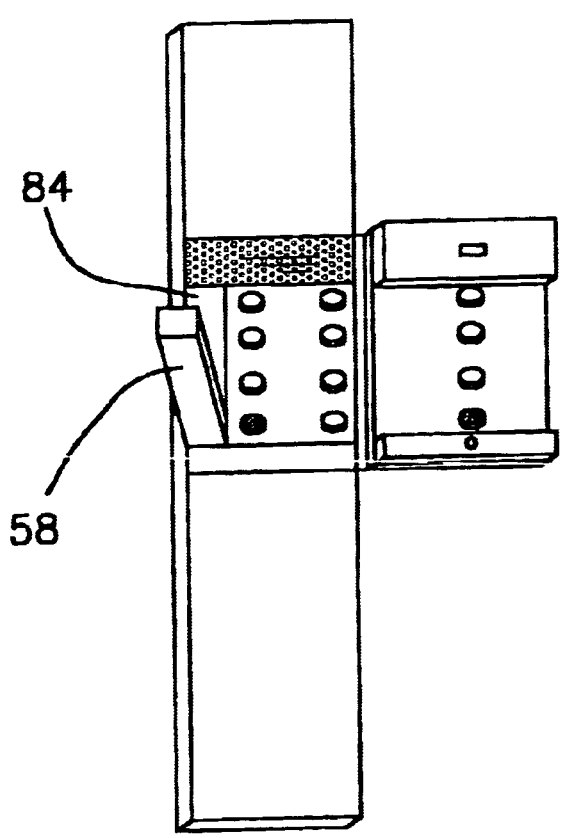
FIGS. 19(a)–19(b) illustrate a wrist communication device employing an antenna system in still another embodiment of the invention.
Figure 19B:
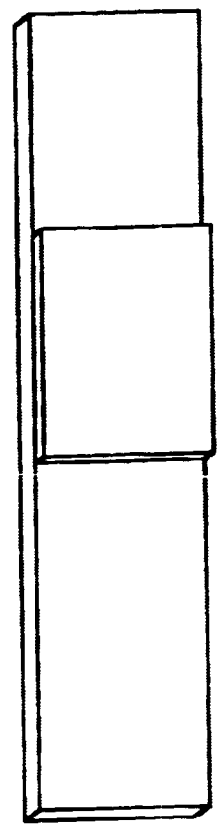

Finally, FIGS. 19(a) and 19(b) illustrate another embodiment of the invention, wherein a base area 84 is disposed underneath antenna 58.

During operation, antenna system 60 provides for an arrangement wherein the antenna for the wrist communication device 5 are extended away from the user's body, allowing an enhanced transmission and reception ability. Furthermore, the location of the antenna system advantageously near the keypad arrangement and the handset arrangement provides for a user friendly interface system, wherein the LCD display, the keyboard members, the handset and the antenna are conveniently located near each other, although the invention is not limited in scope in that respect.

While only certain features of the invention have been illustrated and described herein, many modifications, substitutions, changes or equivalents will now occur to those skilled in the art. It is therefore, to be understood that the appended claims are intended to cover all such modifications and changes that fall within the true spirit of the invention.

I claim:

1. A wrist-mounted communication device comprising a main body and a detachable multi-sectioned handset coupled to said main body, said handset comprising at least two sections wherein said multi-sectioned handset is configured to move between a closed position and an open position, wherein in open position said sections of said multi-sectioned handset expand to provide an extended handset and wherein said handset comprises a wireless connection with said wrist-mounted communication device.

2. The device according to claim 1, wherein said handset is wired to said wrist-mounted communication device.

3. The device according to claim 1, wherein said handset comprises a speaker.

4. The device according to claim 1, wherein said handset comprises a microphone.

5. The device according to claim 1, wherein said main body of said wrist-mounted communication device comprises a microphone.

6. The device according to claim 1, wherein said main body of said wrist-mounted communication device further comprises a display unit.

7. The device according to claim 4 or 6, wherein said watch unit and said display unit are in opposite relationship on a user's wrist.

8. The device according to claim 1, wherein said main body of said wrist-mounted communication device further comprises a keypad unit.

9. The device according to claim 4 or 8, wherein said watch unit and said keypad unit are in opposite relationship on a user's wrist.

10. The device according to claim 8, wherein said keypad unit is a multi-sectioned keypad unit comprising at least two sections.

11. The device according to claim 10, wherein the keys of said keypad unit are distributed on at least two of said keypad sections.

12. The device according to claim 11, wherein the keys of said keypad are distributed on at least two of said sections of said keypad so as said keys are spaced sufficiently far apart on said enlarged surface so as to minimize the likelihood of a user's finger inadvertently pressing buttons which said user does not intend to press.

13. The device according to claim 1, wherein said main body of said wrist-mounted communication device further comprises an antenna unit.

14. The device according to claim 6, or, 8, or 13, wherein while attached to said main body of said wrist-mounted communication device, said handset covers at least part of at least one of said units.

15. The device according to claim 13, wherein said antenna comprises a biasing mechanism wherein;

said antenna is held in horizontal plane position of said wrist-mounted communication device when said device is not in use by a user; and said biasing mechanism releases said antenna in a desired position relative to said horizontal plane when said wrist communication device is in use by said user.

16. The device according to claim 1, wherein said handset comprises a keypad unit.

17. The device according to claim 16, wherein said keypad is extended on at least two sections of said extended handset and the keys of said extended keypad are distributed on the surfaces of at least two sections of said extended handset so as said keys are spaced sufficiently far apart so as to minimize the likelihood of a user's finger inadvertently pressing buttons which said user does not intend to press.

18. The device according to claim 1, wherein said multi-sectioned handset comprises at least one display unit.

19. The device according to claim 1, wherein said handset sections are extendable by unfolding said handset via a hinge.

20. The device according to claim 1, wherein handset sections are configured to extend telescopically, such that said sections are extendable by sliding said sections relative to each other.

21. The device according to claim 1, wherein said handset further comprises a telescopically extendable antenna.

22. The device according to claim 1, wherein said main body of said wrist-mounted communication device further comprises a watch unit.

23. The device according to claim 22, wherein said watch unit and the location of attachment of said handset to said main body of said wrist-mounted communication device are in opposite relationship on a user's wrist.

24. A wrist-mounted communication device comprising a main body and a detachable multi-sectioned handset coupled to said main body, said handset comprising at least two sections wherein said multi-sectioned handset is configured to move between a closed position and an open position, wherein in open position said sections of said multi-sectioned handset expand to provide an extended handset and wherein said handset sections are configured to extend telescopically, such that said sections are extendable by sliding said sections relative to each other.

25. The device according to claim 24, wherein said handset is wired to said wrist-mounted communication device.

26. The device according to claim 24, wherein said handset further comprises a wireless connection with said wrist-mounted communication device.

* * * * *